(12) United States Patent
Randall et al.

(10) Patent No.: US 12,501,106 B2
(45) Date of Patent: Dec. 16, 2025

(54) SELECTIVE VIDEO MODIFICATION

(71) Applicant: Pimloc Limited, Yarnton (GB)

(72) Inventors: Simon William Randall, Yarnton (GB); James Leigh, Yarnton (GB); Julian Ralph Windyer Morris, Yarnton (GB); Nicholas Benedict van Someren, Yarnton (GB)

(73) Assignee: Pimloc Limited, Yarnton (GB)

( * ) Notice: Subject to any disclaimer, the term of this patent is extended or adjusted under 35 U.S.C. 154(b) by 0 days.

(21) Appl. No.: 18/309,152

(22) Filed: Apr. 28, 2023

(65) Prior Publication Data

US 2023/0269422 A1 Aug. 24, 2023

Related U.S. Application Data

(63) Continuation of application No. PCT/GB2021/052821, filed on Nov. 1, 2021.

(30) Foreign Application Priority Data

Nov. 2, 2020 (GB) ...................................... 2017329

(51) Int. Cl.
*H04N 21/438* (2011.01)
*H04N 21/44* (2011.01)

(52) U.S. Cl.
CPC ..... *H04N 21/438* (2013.01); *H04N 21/44008* (2013.01)

(58) Field of Classification Search
CPC ....................... H04N 21/438; H04N 21/44008
See application file for complete search history.

(56) References Cited

U.S. PATENT DOCUMENTS

2014/0195976 A1* 7/2014 Ow ..................... G06F 16/176
715/833
2016/0294781 A1 10/2016 Ninan et al.
(Continued)

FOREIGN PATENT DOCUMENTS

CA 3034028 A1 * 8/2020 ........... G06F 21/602
KR 1020130114037 A 10/2013
KR 1020190120663 A 10/2019

OTHER PUBLICATIONS

International Search Report and Written Opinion dated Mar. 4, 2022 for PCT Application No. PCT/GB2021/052821.
(Continued)

*Primary Examiner* — Sumaiya A Chowdhury
(74) *Attorney, Agent, or Firm* — EIP US LLP

(57) ABSTRACT

A computer-implemented method for processing a video stream is provided. The method comprises receiving a video stream, selecting portions of the image data, and modifying the selected portions to generate modified portions of image data. Second data is generated for use in recovering at least some of the selected portions from the modified portions. The second data, unselected portions of the image data, and the modified portions of the image data are output. A system and non-transitory computer-readable storage medium according to this method are also provided. A computer-implemented method for data processing is provided. The method for data processing comprising receiving second data and modified portions of the image data, and processing at least some of the modified portions using the second data to recover selected portions of the image data. A system and non-transitory computer-readable storage medium according to the method for data processing are also provided.

18 Claims, 15 Drawing Sheets

(56) References Cited

U.S. PATENT DOCUMENTS

2018/0189505 A1* 7/2018 Ghafourifar ........ G06F 21/6209
2018/0268240 A1  9/2018 Loce et al.

OTHER PUBLICATIONS

Combined Search and Examination Report dated Apr. 26, 2021 for GB Application No. GB2017329.0.

* cited by examiner

SELECTIVE VIDEO MODIFICATION

CROSS-REFERENCE TO RELATED APPLICATIONS

This application is a continuation under 35 U.S.C. § 120 of International Application No. PCT/GB2021/052821, filed Nov. 1, 2021 which claims priority to United Kingdom Application No. GB 2017329.0, filed Nov. 2, 2020, under 35 U.S.C. § 119(a). Each of the above-referenced patent applications is incorporated by reference in its entirety.

BACKGROUND

Field of the Invention

Examples disclosed herein are concerned with processing a video stream. In particular, but not exclusively, examples relate to data processing systems and computer-implemented methods for processing a video stream.

Description of the Related Technology

The present disclosure generally relates to the use of data processing systems and methods for modifying a video stream. A video stream may generally be considered to be a sequence of digital signals, or packets of data, representing a plurality of frames of image data. Video streams may also comprise other data, such as audio data, and metadata which can be used to process the video stream to display a video to a user via a suitable media player.

Videos are captured in many different environments, and for a number of different purposes. Purely by way of example, a video may be captured for the purpose of entertainment, surveillance, and for analysing real-world environments. Video data, captured using a video capture device, can be transmitted from the video capture device to computing devices. Such computing devices may perform any number of functions including, for example, storing, compressing, encoding, transmitting and/or receiving the video data. Video data may be sent, or streamed, to a plurality of different such computing devices for receipt by a plurality of users.

In some cases, a particular sequence of video data may be modified differently to suit different recipients. It would be desirable to provide an improved process for transmitting the video data to these different recipients.

SUMMARY

According to a first aspect of the present disclosure, there is provided a computer-implemented method for processing a video stream, the computer-implemented method comprising: receiving a video stream comprising a plurality of frames of image data; selecting portions of the image data on the basis of first data indicating locations within the image data; modifying the selected portions to generate modified portions of the image data; generating second data for use in recovering at least some of the selected portions from the modified portions; and outputting the second data, unselected portions of the image data and the modified portions of the image data.

Outputting the modified portions of the image data and the unselected portions of the image data allows a selectively modified, for example, a selectively redacted, video stream to be generated and provided to users. The first data indicating the locations within the image data may take any of a number of forms which will become apparent from the implementations described herein. For example, the first data may comprise a copy of the portions of the image data which are to be selected. Alternatively, or additionally, the first data may include pointers to portions of the image data which are to be selected, e.g. copies of metadata associated with data packets comprising image data which is to be selected, a pointer to a location (e.g. a timestamp) within a bitstream comprising image data and an indication of a number of bytes of image data following the location (or timestamp) which are to be selected, pointers to one or more macroblocks of image data which are to be selected, and/or one or more image masks each associated with at least one of the frames of image data from the plurality of frames of image data and indicating a region within the at least one frame which is to be selected.

Outputting second data allows the original video stream to be recovered from the modified portions of the image data and the unselected portions of the image data. In this way it is possible to achieve security and/or privacy objectives, such as preventing a wide distribution of a video stream comprising sensitive information, while also providing an unmodified video stream to certain users who need access to the sensitive information. The second data can be implemented in a number of ways depending on the manner in which the selected portions of image data are modified. In certain examples, the second data comprises differences between selected portions of the image data and respective modified portions of the image data. Differences, in this case, relate to differences between pixel intensity values represented by the modified portions of the image data and pixel intensity values represented by respective selected portions of the image data. In other examples, the second data identifies the location of the modified portions of the image data. The location of the modified portions of image data may be identified with respect to the unselected portions of the image data and/or with respect to a video stream comprising the modified and unselected portions of the image data. The second data may include copies of metadata identifying the modified portions of the image data, e.g. metadata associated with header portions of data packets comprising modified portions of the image data, to allow the modified portions of image data to be identified. The second data may identify the locations of the modified portions of the image data in other suitable ways, for example, the implementations described above in relation to the first data identifying the portions of image data which are to be selected may also apply to examples of second data identifying the modified portions. The second data may comprise further information, for example, encryption metadata relating to encryption methods used to encrypt the second data and/or the modified portions of the image data. By providing the second data rather than generating two separate output video streams, each comprising different respective modified and unselected portions of image data, managing which users are able to access the selected portions of image data may be simplified.

According to a second aspect of the present disclosure, there is provided a data processing system for processing a video stream comprising: at least one processor; and storage comprising computer-executable instructions which, when executed by the at least one processor, cause the at least one processor to perform a computer-implemented method according to the first aspect.

According to a third aspect of the present disclosure, there is provided a non-transitory computer-readable storage medium comprising computer-executable instructions which, when executed by at least one processor, cause the at least one processor to perform a computer-implemented method according to the first aspect.

According to a fourth aspect of the present disclosure, there is provided a computer-implemented method for data processing, the computer-implemented method comprising: receiving second data and modified portions of image data generated using a computer-implemented method according to the first aspect; and processing at least some of the modified portions using the second data to recover selected portions of the image data.

This allows the selected portions of image data to be recovered without having access to the original video stream. Therefore, certain users may be able to access and/or view an unmodified version of the original video stream.

According to a fifth aspect of the present disclosure, there is provided a data processing system for processing image data comprising: at least one processor; and storage comprising computer-executable instructions which, when executed by the at least one processor, cause the at least one processor to perform a method according to the fourth aspect of the present disclosure.

According to a sixth aspect of the present disclosure, there is provided a non-transitory computer-readable storage medium comprising computer-executable instructions which, when executed by at least one processor, cause the at least one processor to perform a computer-implemented method according to the fourth aspect.

Further features and advantages will become apparent from the following description of preferred examples, which is made with reference to the accompanying drawings.

BRIEF DESCRIPTION OF THE DRAWINGS

Examples of the present disclosure are described below with reference to the accompanying drawings.

DETAILED DESCRIPTION

Figure 1:
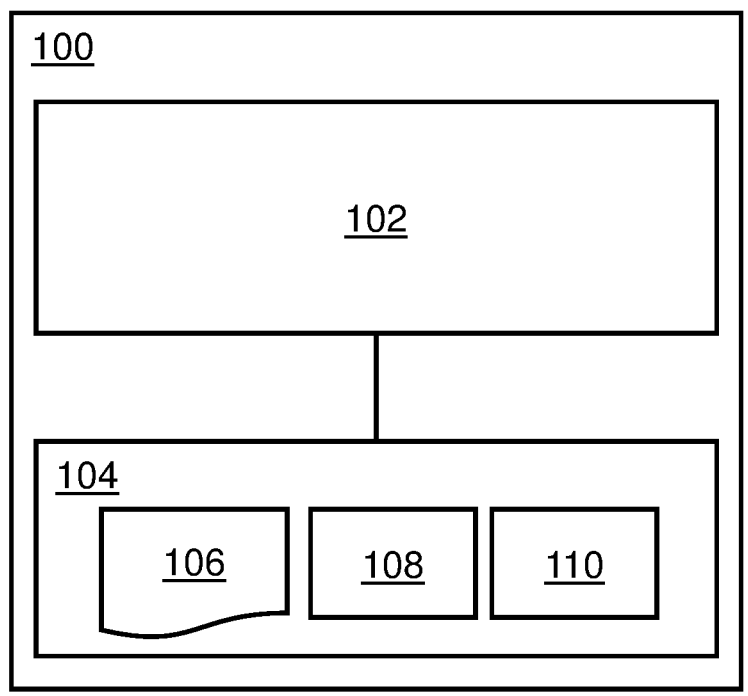
FIG. 1 is a schematic diagram showing a data processing system for processing a video stream according to examples.

The use of video recording equipment in public and private spaces is ubiquitous and the processing and distribution of the resulting video footage presents a number of technical challenges. One such challenge is to manage security and privacy while enabling the video footage to be used for its intended purpose.

For example, video surveillance footage, captured for security purposes, is often used by people with the relevant authorization, such as the police, to identify specific people, objects, and/or to provide evidence of events, such as crimes, which may occur in a given location. In this example, the video footage may also comprise sensitive information which is not relevant for the purposes described above. It is desirable that sensitive, or private, information is not distributed and/or shown to people without the relevant authorization to access this information. Surveillance footage, captured in a public space, may show the faces of people who were present in the public space as well as other sensitive information, such as pictures of identification cards, credit cards, private or confidential paperwork, and/or objects. Furthermore, what is considered sensitive, or private, information may depend on an environment in which the video is captured. In public spaces, little information captured in a video may be considered private. In private facilities, such as offices, factories, and homes, a relatively larger amount of information which is captured in a video may be considered sensitive or private.

While the example above relates to surveillance footage, video data, captured for other purposes aside from surveillance, may also contain a combination of sensitive and non-sensitive information. As the quality of video footage and recording equipment increases, the number of applications for which video footage is used is commensurately increasing. For example, recording video footage may be used as part of a manufacturing pipeline in a factory to monitor and/or control certain processes. The captured video footage may be processed automatically, using computer-vision techniques, or may be reviewed manually by human operators. In this case, products being manufactured, or parts of the manufacturing process itself, can be confidential. Other examples include monitoring office spaces, traffic, pedestrian flow, and even for environmental purposes to monitor movements and/or numbers of flora and/or fauna in a given area. In all of these cases, sensitive information may be captured either intentionally or unintentionally.

Digital videos are generally stored and transmitted in the form of video streams. Video streams may comprise one or more bitstreams such as an audio data bitstream and an image data bitstream. Video streams may be stored as files having suitable container formats, for example, MP4, AVI, and so on, which enable a single file to store multiple different bitstreams. Bitstreams may be arranged into a plurality of data packets, each of which contains an integer number of bytes. Data packets comprise a header portion, specifying (among other information) the type of payload, and the payload itself, which in the case of video may be Raw Byte Sequence Payload (RBSP). The types and number of data packets depend on the techniques which are used to generate the bitstreams. For example, the H.264 Advanced Video Compression (H.264 AVC) standard provides a bitstream comprising a sequence of Network Abstraction Layer (NAL) packets having a payload comprising N bytes. There can be 24 different types of packets which may be included in the bitstream. Examples of packet types in the H.264 AVC standard include, undefined, slice data partition A, slice data partition B, slice data partition C, sequence parameter set, picture parameter set, and so forth.

An image data bitstream comprises a plurality of frames of image data and is generated by processing raw image data from an image sensor into a format which is suitable to be viewed using a media player application on a computer device. The plurality of frames of image data may be arranged sequentially in an image data bitstream and/or indications of the respective positions of each frame of image data may be included in the image data bitstream, e.g. timestamps, such that the frames of image data can be viewed in the correct order using a media player application.

A frame of image data comprises data representing a plurality of pixel intensity values generated by at least one image sensor. An image sensor is a sensor which converts light into a digital signal representing an intensity of light incident on the image sensor. Image sensors may operate in the visible light spectrum, but may additionally, or alternatively, include sensors which operate outside of the visible light spectrum, for example, the infrared spectrum. By using at least one image sensor to capture a plurality of frames of image data, for example, at least two frames of image data, sequentially in time, it is possible to generate a video. In other implementations, a video may be generated from at least two frames of image data which are not captured sequentially in time.

Video streams are generally encoded to compress the video stream for storage and/or transmission. Encoding involves using a video encoder implemented as any suitable combination of software and hardware, to compress a digital video. There is a plurality of techniques that can be used to encode videos. One such technique is specified in a technical standard commonly referred to as the H.264 AVC standard, mentioned above. Video encoders, like those implementing the H.264 AVC standard, encode videos based on macroblocks of pixels in the video stream. A macroblock is a unit used in image and video compression which comprises a plurality of pixels. For example, image data can be grouped into macroblocks of 16×16 pixels for the purposes of encoding.

Macroblocks are encoded by performing one or more transform operations, such as integer transform, to generate transform coefficients. Quantisation is performed on the resulting transform coefficients, and the quantised transform coefficients are subsequently entropy encoded to produce an encoded bitstream.

In some implementations, macroblocks may be processed in slices, a slice being a group of one or more macroblocks generally processed in raster scan order. Each frame of image data is generally made up of a plurality of slices, although in some cases a frame of image data may be constructed from a single slice. Some video encoding and compression standards provide support for so-called flexible macroblock ordering. This allows macroblocks to be grouped, processed, encoded, and sent in any direction and order, rather than just raster scan order. In particular, macroblocks can be used to create shaped and non-contiguous slice groups. Some specifications for video compression, for example the mentioned H.264 AVC standard, specify different types of scan patterns of the macroblocks for generating slices including, for example, interleaved slice groups, scattered or dispersed slice groups, foreground groups, changing groups, and explicit groups.

Certain examples described herein relate to systems and methods for processing a video stream to modify image data comprised in the video stream. Portions of image data in the video stream may be selected and modified based on one or more predetermined criteria. Where there are security and/or privacy related considerations for the video stream, e.g. where the video stream is to be distributed to a large number of people, the modification of the selected portions may function to increase the security and/or privacy of relevant portions of the image data.

Certain examples, described below, involve modifying portions of image data by changing the portions of image data so that they omit information which was in the unmodified portion of image data. Other examples provide techniques in which modifying portions of image data includes encrypting the portions of image data to inhibit or prevent unauthorised access to the portions of image data.

FIG. 1 shows a data processing system 100 suitable for processing video streams that are the subject of the mentioned examples. The system 100 comprises at least one processor 102 and storage 104, the storage 104 comprising computer-executable instructions 106. In some examples, the storage 104 may also comprise computer program code for implementing one or more further modules such as an object detection module 108 and a decoder 110. The data processing system 100 may also comprise further elements, not shown in FIG. 1 for simplicity. For example, the data processing system 100 may further comprise one or more communication modules, for transmitting and receiving data, further software modules, for performing functions beyond those described here, and one or more user interfaces, to allow the data processing system 100 to be operated directly by a user.

The processor(s) 102 comprises any suitable combination of various processing units including a central processing unit (CPU), a graphics processing unit (GPU), an Image Signal Processor (ISP), a neural processing unit (NPU), and others. The at least one processor 102 may include other specialist processing units, such as application specific integrated circuits (ASICs), digital signal processors (DSPs), or field programmable gate arrays (FPGAs). For example, the processor(s) 102 may include a CPU and a GPU which are communicatively coupled over a bus. In other examples, the at least one processor 102 may comprise a CPU only.

The storage 104 is embodied as any suitable combination of non-volatile and/or volatile storage. For example, the storage 104 may include one or more solid-state drives (SSDs), along with non-volatile random-access memory (NVRAM), and/or volatile random-access memory (RAM), for example, static random-access memory (SRAM) and dynamic random-access memory (DRAM) Other types of memory can be included, such as removable storage synchronous DRAM, and so on. The computer-executable instructions 106 included on the storage 104, when executed by the at last one processor 102, cause the processor(s) 102 to perform a computer-implemented method for processing a video stream as described herein.

The data processing system 100 may be implemented as part of a single computing device, or across multiple computing devices as a distributed data processing system. The data processing system 100 may be included in a device used for capturing video (or a video camera). For example, the data processing system 100 can be included as part of the processing circuitry in the video camera. Alternatively, the data processing system 100 may be separate from the video camera and included in an image processing pipeline which includes the video camera. In this case, the data processing system 100 is connected to an output of the video camera over any suitable communication infrastructure, such as local or wide area networks, through the use of wired and/or wireless means.

Figure 2:
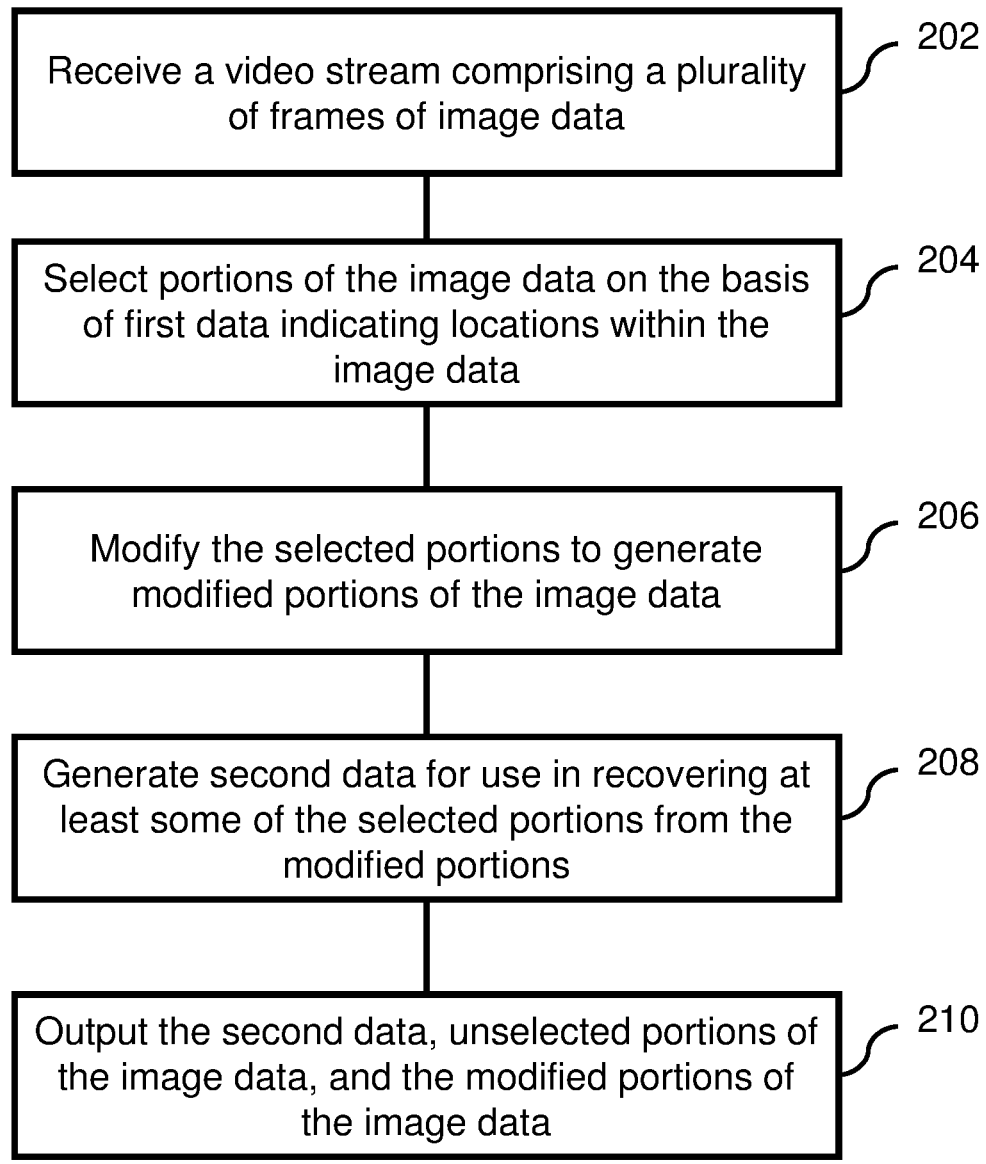
FIG. 2 is a flow chart showing a computer-implemented method for processing a video stream according to examples.

A computer-implemented method 200 for processing a video stream according to an example and which is implemented by the data processing system 100, will now be described with reference to FIGS. 2 to 6. FIG. 2 shows a flow diagram illustrating the computer-implemented method 200, and FIGS. 3 to 6 show block diagrams of example implementations of the computer-implemented method 200.

Figure 3:
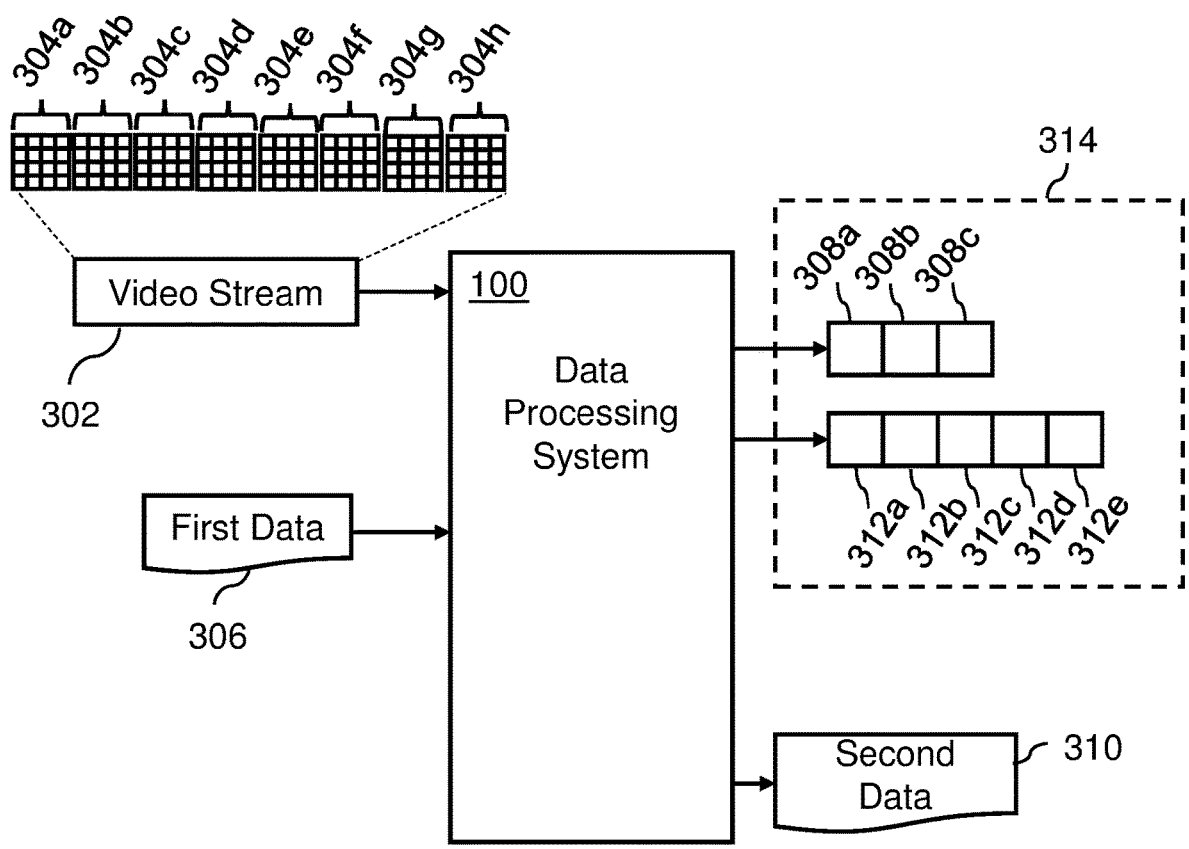
FIG. 3 is a block diagram illustrating a computer-implemented method for processing a video stream according to examples.

With reference to FIGS. 2 and 3, at a first block 202 of the flow diagram, the data processing system 100 receives a video stream 302 comprising a plurality of frames of image data 304a to 304h.

In some examples, a video camera used to generate the video stream 302 may include an encoder to encode image data generated by an image sensor in the video camera. In other implementations, the video camera may output a video stream 302 which has not been encoded. Accordingly, the video stream 302 which is received by the data processing system 100 may be encoded or unencoded. If the video stream 302 is received in an encoded format the data processing system 100 decodes the video stream 302 using suitable algorithms such as those provided by a decoder 110 which implements a decoding technique which corresponds to the encoding technique used to encode the video stream 302.

At a second block 204, the data processing system 100 selects portions of the image data on the basis of first data 306 indicating locations within the image data. The first data 306 may be implemented in a number of ways, for example, the first data 306 may include a copy of portions of the image data which are to be selected, pointers to the portions of the image data which are to be selected (e.g. metadata associated with data packets comprising portions of image data to be selected), one or more timestamps relating to a location in a bitstream comprising the image data, indications of macroblocks of image data which are to be selected. In the present example, the first data 306 comprises one or more image masks each associated with at least one frame of the plurality of frames of image data. The image masks each identify regions in at least one frame of image data which are to be selected.

The selected portions of the image data represent objects in the frames of image data which are to be modified, for example, to redact or obscure information in the image data.

The image masks (the first data 306), may be generated automatically using object detection algorithms performed on the image data. For example, image masks can be generated by processing the plurality of frames of the image data 304a to 304h using computer vision techniques to identify, (or detect), at least one predetermined class of object represented by the image data.

Where computer vision techniques are used to generate the image masks, the one or more predetermined classes may comprise any class of object which is detectable by computer-vision techniques. Examples of predetermined classes of objects include buildings, people, personal belongings, specific groups of people, specific individuals, and specific parts of people, such as their faces. Predetermined classes may also comprise sensitive documentation such as credit cards, identification cards, confidential documents, vehicle registration and/or license plate numbers, and so on. One or more classifiers, such as an artificial neural network, can be used as part of a computer-vision technique to identify the at least one predetermined class of object.

Various combinations of artificial neural networks can be used to identify at least one predetermined class of object represented by the image data, for example a combination of two more convolutional neural networks comprising different architectures or trained to detect different classes of objects. Artificial neural networks used for object identification may include any suitable number of layers, including an input layer, one or more hidden layers, and an output layer. When using a combination of two or more neural networks, an output from a first artificial neural network may be provided to the input of one or more second artificial neural networks. Outputs from a plurality of artificial neural networks may be combined using suitable mathematical operations, as will be appreciated by a person skilled in the art.

Alternatively, or additionally, at least one of the image masks may be generated based on an input from a user. A user may view the video on a display and may use one or more user interfaces to select regions in the video which are to be modified. For example, a user may select the face of a person within the video which is to be redacted. An image mask may then be generated based on the selection of the face. In some examples, generating image masks may include tracking the face across multiple frames of image data and generating image masks which identify all relevant portions of image data, representing the face, which are to be modified.

The first data 306, such as one or more image masks, may be generated locally at the data processing system 100, such as where the data processing system 100 comprises an object detection module 108. Alternatively, the first data 306 may be generated remotely from, and transmitted to, the data processing system 100. In either case, the first data 306 may be stored in the storage 104 and the method 200 may comprise accessing the storage 104 to retrieve the first data 306.

The data processing system 100 modifies, at a third block 206, the selected portions of the image data to generate modified portions of the image data 308a to 308c. Modifying the selected portions of the image data may involve performing one or more operations on the selected portions of image data to obscure information represented by the selected portions. For example, where the selected portions of the image data represent sensitive or private information, such as pictures of faces, modifying the selected portions of the image data comprises obscuring the faces by performing suitable operations on the selected portions of image data.

The resulting modified portions of the image data 308a to 308c may comprise a blurred, redacted, or otherwise censored version of the unmodified image, and the private or sensitive information may be replaced with a sign or symbol indicating that those parts of the image are sensitive and/or have been censored.

Modifying the selected portions of the image data may comprise modifying the selected portions of the image data to remove sensitive or private information while obscuring the fact that the selected portions have been modified. For example, modifying the selected portions may comprise replacing the selected portions of the image data with image data representing a background in the image, such that the sensitive or private information is removed without replacing the sensitive information with blur or noise. The image data representing the background may be generated based on previous frames of image data in which the sensitive or private information is not present at the particular location in the frame of image data, so that only the background is visible. Alternatively, or additionally, the image data representing a background in the image may be artificially generated based on the unselected portions of the image data 312a to 312e.

At a fourth block 208, the data processing system 100 generates second data 310 for use in recovering at least some of the selected portions from the modified portions 308a to 308c. The second data 310 which is generated, and the manner in which it can be used to recover the selected portions, is dependent on the method used to modify the selected portions. In some examples, the second data 310 comprises data identifying the location of the modified portions of the image data 308a to 308c. The location of the modified portions of the image data 308a to 308c may be identified with respect to the unselected portions of the image data 312a to 312e and/or with respect to a video stream comprising the modified and unselected portions of the image data. To this end, the second data 310 may comprise metadata identifying the modified portions of the image data 308a to 308c, e.g. metadata associated with header portions of data packets comprising modified portions of the image data 308a to 308c.

In certain examples, such as those which will be described below in relation to FIGS. 3 to 6, the second data 310 may additionally, or alternatively, comprise differences between selected portions of the image data and respective modified portions of the image data 308a to 308c. Differences, in this context, may relate to differences between pixel intensity values represented by the modified portions of the image data 308a to 308c and pixel intensity values represented by respective selected portions of the image data. Generating second data 310 which can be used in recovering the selected portions of image data allows the original video stream 302 to be recovered from the modified portions 308a to 308c and the unselected portions of the image data 312a to 312e. As such, selected portions and hence the original video stream 302 can be discarded. This reduces storage requirements that are otherwise necessary to maintain both a modified version of the video stream, in which certain parts of the images are modified, and the original video stream 302.

The data processing system 100 outputs, at a fifth block 210, the second data 310, for example, in the form of differences between the modified portions of the image data 308a to 308c and the selected portions of the image data, together with unselected portions of the image data 312a to 312e, and the modified portions of the image data 308a to 308c. This enables a modified version of the video stream 302 to be distributed, in the form of the modified portions 308a to 308c and the unselected portions of the image data 312a to 312e, to users to view the video. By distributing the modified portions of the image data 308a to 308c and the unselected portions of the image data 312a to 312e it is possible to provide users who wish to view the video stream 302 with a version in which certain information may be obscured, depending on the selection of the portions of the image data. In this way, security and/or privacy related objectives may be achieved while also providing relevant parts of the video stream 302 to users.

In some examples, outputting the modified portions of the image data 308a to 308c and the unselected portions of the image data 312a to 312e comprises generating an output video stream 314. The output video stream 314 comprises a further plurality of frames of image data, where the further plurality of frames of image data includes the modified portions of image data 308a to 308c and the unselected portions of the image data 312a to 312e. In this way it is possible for the output video stream 314 to be stored in a file in a suitable container format to be viewed using an appropriate media player. This may include sending the file to users and/or providing a web-based media player allowing users to view the output video stream 314 remotely.

Conversely, when the further plurality of frames of image data do not include the selected portions of the image data, it is not possible for viewers of the output video stream 314 to view or reconstruct the original video stream 302 from the output video stream 314. This maintains the privacy and/or security of the selected portions of image data.

For users who are authorised to view the original video stream 302 the second data 310, e.g. in the form of differences between modified and selected portions of the image data, may be provided as an output data stream, so that these users may recover the selected portions of the image data and hence reconstruct the original video stream 302. To this end, the second data 310 can be generated in a suitable format, such as a data packet, or an NAL packet according to the H.264 AVC standard. To enable efficient transfer of the second data 310, encoding methods can be applied to a data packet comprising the second data 310. The second data 310 may also be embedded in the output video stream 314. This allows the second data 310 to be provided to a recipient who is already set up to receive the output video stream 314. Where the modified portions of the image data 308a to 308c and the unselected portions of the image data 312a to 312e are included in an output video stream 314, the output video stream 314 may be encoded using any suitable encoding method. In some examples, such as those described below in relation to FIG. 4, encoding the second data 310 and/or the further plurality of frames of image data in the output video stream 314 may involve use of e.g. standards complaint encoding methods. In other examples, such as those described in relation to FIG. 5, the encoding may involve use of modified standards compliant encoding methods.

Figure 4:
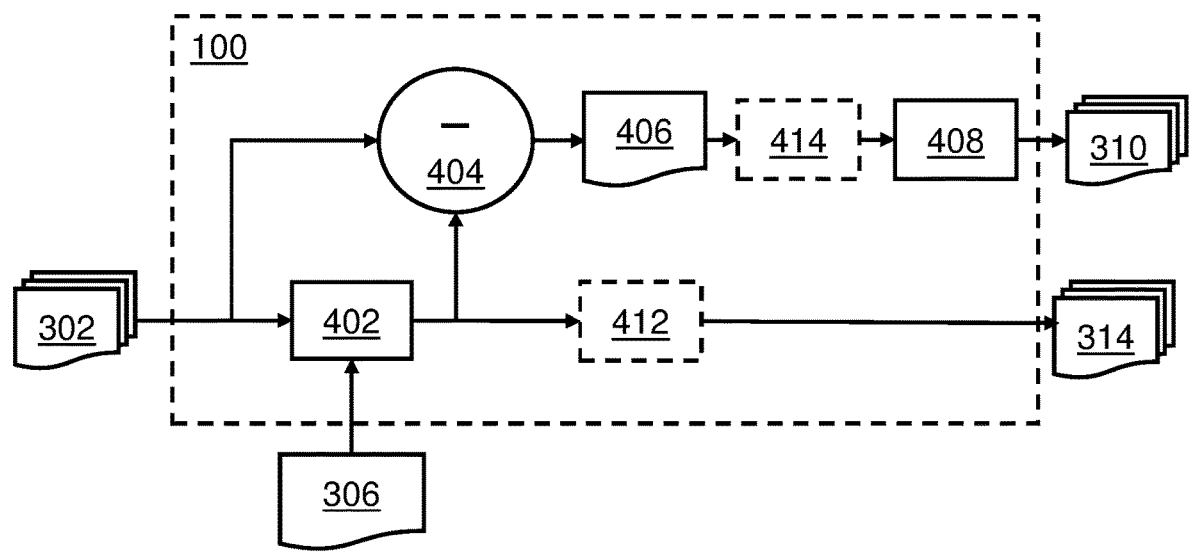
FIG. 4 is a block diagram showing a process of modifying selected portions of the image data and generating second data according to examples.

In the example shown in FIG. 4, the encoding processes, used to encode the second data 310 and the output video stream 314, include standards compliant encoding techniques, e.g. encoding techniques implemented by a general H.264 encoder. The video stream 302 is received at the data processing system 100 and input into first module 402, for selecting and modifying portions of image data, and a difference engine 404.

The first module 402 receives the video stream 302 and the first data 306. The first module 402 uses the first data 306 to select portions of the image data included in the video stream 302. As described above, the first data 306 may include one or more image masks identifying locations within the image data. For example, the image masks may identify parts of the image data (or regions of the images) representing private or sensitive information. Selected portions of the image data may include sub-frame sized portions of the image data and/or whole frames of image data.

The portions of the image data which are selected are then modified to conceal information represented by the selected portions of the image data. Modifying the selected portions of the image data may involve the use of one or more operations, e.g. applying one or more filters to the selected portions of the image data, replacing the selected portions of the image data with randomly or pseudo-randomly generated image data, and/or replacing the selected portions with alternative predetermined image data. The first module 402 produces the output video stream 314 which includes a further plurality of frames of image data. The further plurality of frames of image data may be arranged in the same sequence as the plurality of frames of image data 304a to 304h in the video stream 302, but with the selected portions of the image data being replaced in line with the modified portions of the image data 308a to 308c The output video steam 314, output from the first module 402, is provided to the difference engine 404. The difference engine 404 compares the plurality of frames of image data 304a to 304h, included in the video stream 302, with respective frames of image data in the further plurality of frames of image data from the output video stream 314 to generate difference data 406. The difference data 406 comprises differences between the selected portions of the image data and respective modified portions of the image data 308a to 308c. For example, for each frame of image data 304a to 304h, the difference data 406 may comprise one or more image masks. The image masks specify the differences between the selected portions of image data and the modified portions of image data 308a to 308c. The image masks may also identify the positions of the modified portions of the image data 308a to 308c with respect to the unselected portions of image data in the output video stream 314.

The difference data 406 is processed to generate second data 310 which is encrypted at a second module 408. Accordingly, the second data 310 includes at least some of the difference data 406 and hence a difference between at least one of the selected portions of the image data and a respective modified portion of the image data 308a to 308c. The modified portion of the image data 308a to 308c can be processed based on a difference represented by the second data 310 to recover the selected portion of the image data. Encrypting the differences between the modified and selected portions may involve using any suitable encryption method to secure the differences and inhibit unauthorised persons from accessing the differences. By encrypting the second data 310, including the differences between the selected and modified 308a to 308c portions of the image data, it is possible to embed the second data 310 in the output video stream 314 which can be widely distributed while ensuring that only authorised persons are able access the difference information for recovering the selected portions of the image data. Hence a single output video stream 314 may be provided by which different users have access to different versions of the video represented by the video stream 314. For example, certain users may be provided with an encryption key to decrypt and access the differences between the selected and modified 308a to 308c portions of the image data, while other users are not provided access to encryption keys.

Encrypting the second data 310 may, in some instances, include encrypting the second data 310 according to a single-use encryption key. A single-use encryption key allows the second data 310 to be decrypted once so that it can be used to recover the selected portions. Thereafter, the second data 310 is no longer able to be decrypted by a user to whom it is provided. This allows the selected portions of the image data to be recovered for a single limited and specific circumstance while maintaining the general security of the information represented by the second data 310. This is of particular use where the method 200 is implemented for a video stream 302 which contains highly sensitive information. In one such example, the video stream 302 represents surveillance footage which is relevant to a criminal investigation. In this case, it is desirable to temporarily recover the selected portions of the image data such that the unredacted video stream 302 can be viewed by a jury. After the unredacted video stream 302 has been viewed by the jury it is desirable that the second data 310 cannot be decrypted again so that any unauthorized persons, who obtain the second data, are not able to recover the selected portions of the image data and thereby can only view the redacted video stream 314. Where a single-use encryption key is used to encrypt at least part of the second data 310, the single-use encryption key may be a pre-shared encryption key which is provided to a target recipient of the second data 310 through a secure communications channel.

The second data 310 may additionally include metadata, for example metadata relating to the encryption methods used to encrypt the second data 310, metadata for use in identifying a relative position of the modified portions of the image data 308a to 308c in the output video stream 314, and other metadata suitable for use combining the recovered selected portions of the image data and the unselected portions of the image data 312a to 312e to generate a video.

The metadata included in the second data 310 may also include an indication that the second data 310 is available for a single use to recover at least some of the selected portions of the image data from the modified portions of the image data 308a to 308c. In other words, the second data 310 may include metadata specifying that the second data 310 is limited to a single use. To prevent the second data 310 from being used more than once to recover the selected portions of the image data, the metadata may include an instruction to modify the second data 310 after it has been used to recover selected portions of the image data from the modified portions of the image data 308a to 308c. Modifying the second data 310 in this case may include corrupting and/or deleting the second data 310.

Where the output video stream 314 and/or the second data 310 are encoded by the data processing system 100, encoding blocks 412 and 414 are used to encode the respective outputs. In this example, the encoding blocks 412 and 414 may involve use of e.g. standards compliant encoding methods, such as an implementation of encoding methods specified by the H264 AVC standard mentioned above.

Figure 5:
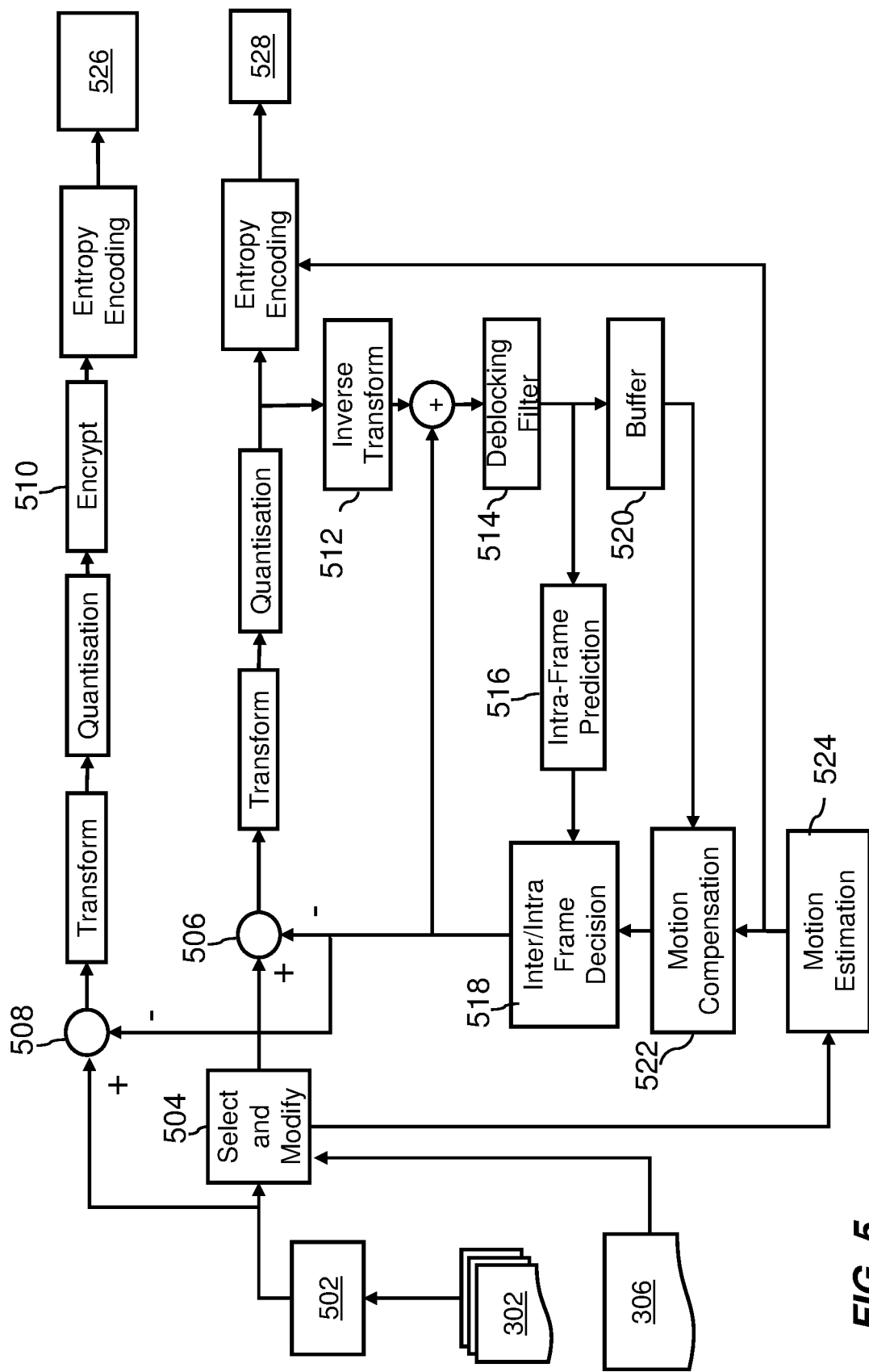
FIG. 5 is a block diagram showing a process of modifying selected portions of the image data and generating second data according to examples which are different to those shown in FIG. 4.

In contrast to the example shown in FIG. 4, in which the video stream is processed at the frame level, in the example shown in FIG. 5, portions of the image data are selected at the macroblock level. In other words, the selected portions of the image data comprise an integer number of macroblocks. In this case, the first data 306 may indicate a location within the video stream 302 and identify an integer number of macroblocks which are to be selected. Alternatively, or additionally, the first data 306 may identify each macroblock which is to be selected. The macroblocks which are to be selected may be located sequentially within the video stream 302. In other implementations, the first data 306 may indicate the locations of a plurality of non-sequential groups of macroblocks, wherein each group of macroblocks comprises one or more macroblocks arranged contiguously within the video stream 302. To identify macroblocks of the image data, first data 306 may include metadata associated with one or more data packets comprising respective payloads each representing at least part of a macroblock of image data which is to be selected.

In certain encoding standards, such as are specified in the H.264 AVC standard, encoding image data for a macroblock involves using predictions generated based on neighbouring macroblocks. These predictions may be intraframe (generated from information within a single frame of image data) or interframe (generated using information from macroblocks in previous and/or subsequent frames of image data). Residuals, generated from differences between input values, included in a macroblock, and predicted values, included in macroblock predictions which are generated based on neighbouring blocks, are encoded to generate an output video stream.

Where portions of the image data which are selected 204 and modified 206 are macroblocks, artefacts can be introduced which are not contemplated in general standards-compliant encoding techniques. If such artefacts are processed using standards-compliant encoding techniques, errors will be introduced. Therefore, in order to ensure these artefacts are properly processed, a customised technique (which may or may not be based on the standards-compliant techniques) is preferably used in the predictions for a macroblock. In the present example, illustrated in FIG. 5, changes are made to general standards-compliant processing and encoding pipelines to mitigate errors which may otherwise occur when selecting and modifying macroblocks of image data. A macroblock 502 from the video stream 302 is selected and modified, at block 504, based on the first data 306. At difference engine 506, a prediction for the macroblock is subtracted from the modified macroblock of image data. Generating the prediction follows a process which is similar to standards-compliant techniques as specified in the H.264 AVC standard but with some modifications as will become apparent from the following description. This process includes inversely transforming 512 the quantised transform coefficients output from part of the encoding pipeline. The process for generating predictions further includes using a deblocking filter 514, generating intra-frame predictions 516, and making inter/intra frame predication decisions 518 based on the output of the prediction 516, and motion compensation 522. The motion compensation 522 is generated from the output of a buffer 520 which is attached to an output of the deblocking filter 514, and an output from a motion estimation module 524. The modification made to standards-compliant techniques here is that an output from the selection and modification block 504 is used in the motion estimation block 524 to compensate for errors which may arise due to the modification of the macroblock 502. For example, an indication that a specific macroblock has been modified may allow the motion estimation block 524 to exclude the modified macroblock from calculations involved in estimating motion.

The macroblock prediction is used to encode the modified macroblock, by generating residuals at difference engine 506, and to encode an unmodified version of the macroblock, by generating residuals at difference engine 508. Both the residuals for the modified and the unmodified version of the macroblock are encoded. The encoded modified macroblock is output at block 528. The residuals for the unmodified version of the macroblock are used to generate second data 310, which is encoded and encrypted, at block 510. An encrypted data packet 526, comprising the second data 310 and which can be provided to users using a data stream, is output from the data processing system 100.

In other examples, the selection and modification of portions of the image data may be performed at the slice level. In other words, the portions of image data which are selected may comprise one or more macroblocks arranged in any suitable slices. Where flexible macroblock ordering is available, the sizes of slices may vary.

In some examples, encrypting the second data 310 comprises encrypting a first part of the second data 310 according to a first security trait and encrypting a second part of the second data 310 according to a second security trait. Encrypting the first and second parts of the second data 310 according to different security traits allows more granularity in the selection of which users are capable of viewing unselected portions of the image data by decrypting the second data 310. The first and second parts of the second data 310 may be different parts of the second data 310, for example, at least one of the first and second parts may comprise data not included in the other of the first and second parts of the second data 310. Where the second data 310 includes differences between selected portions of the image data and modified portions of the image data 308a to 308c, the first part of the second data 310 may include differences between a first set of some of the modified portions of the image data 308a and a respective first set of the selected portions of the image data, while the second part of the second data 310 may include differences between a second set of some of the modified portions of the image data 306b to 306c and a respective second set of the selected portions of the image data. In this way, it may be possible to allow different users to each view a different version of a video, for example, each version having at least one different recovered selected portion than the other versions of the video. It will be appreciated that some parts of the second data 310, for example including metadata for use in identifying positions of the modified portions of image data 308a to 308c in the output video stream 314, may not be encrypted.

Each of the first and second security traits may be associated with a respective different set of one or more encryption keys. By encrypting first and second sets of differences in the second data 310 according to different security traits, it is possible to enable different encryption keys to be used to decrypt the first and second sets of differences. For example, a first user may have access to encryption keys which are suitable for decrypting both the first and second sets of differences and hence can recover all of the selected portions of the image data. A second user may have access to an encryption key which is suitable for decrypting only the first set of differences of the second data 310, and hence is able to recover only the selected portions of the image data associated with the first set of differences. Other users may have access to no encryption keys, or encryption keys suitable for decrypting only the second set of differences in the second data 310.

By encrypting different parts of the second data 310, for examples sets of differences between selected and modified portions of the image data, according to respective security traits a single output from the data processing system 100, e.g. the second data 310, can be provided to a plurality of users, while managing and controlling which of the plurality of users can recover the selected portions of the image data.

This provides an efficient way of securely distributing video to a plurality of users having different authorization levels.

Access to the second data 310 may also be controlled based on a predetermined time interval, such that the second data 310 can only be used to recover the selected portions of the image data within a predetermined time period. Limiting access to the second data 310 to recover the selected portions of the image data based on a predetermined time period provides greater flexibility when controlling access to the unredacted video stream 302. In one example, this is implemented by providing the second data 310 with metadata comprising an expiry date value, indicating a date and/or time at which access to the second data 310 is to expire. The expiry date value may be evaluated when attempting to process the modified portions of the image data 308a to 308c using the second data 310 to determine whether the second data 310 is valid and allowed to be used in this way.

In other examples, the second data 310 is made available to a user only within the predetermined time interval. For example, the method 200 may comprise providing the modified portions of the image data 308a to 308c, and the unselected portions of the image data 312a to 312e to a user at a first time. The modified 308a to 308c and unselected portions of image data 312a to 312e may be provided in the form of the output video stream 314 as described above in relation to FIG. 3. The second data 310 may not be provided to the user at the first time but may be stored in memory.

Providing the portions of the image data 308a to 308c and 312a to 312e to the user may include transmitting the image data 308a to 308c and 312a to 312e to a data processing system being operated by the user, which is different to the data processing system 100 implementing the method 200. Alternatively, the portions of the image data 308a to 308c and 312a to 312e may be provided to the user locally at the data processing system 100 implementing the method 200. For example, the data processing system 100 may implement a computer program allowing users to review the output video stream 314. The user may be assigned access credentials which allow them access to certain video streams such as the output video stream 314.

At a second time that is after the first time, a request to provide the second data 310 to the user may be received. This request may be received in response to the user trying to access the unredacted video stream 302. On receipt of the request, the method 200 includes comparing the expiry date value, included in the metadata of the second data 310, with a reference date value representing a current date and/or time. A predetermined action is performed in response to a determination of whether the expiry date value represents an earlier date and/or time than the reference date value or whether the expiry date value represents a later date and/or time than the reference date value.

If the expiry date value represents a later date and/or time than the reference date value, then the method 200 includes providing the second data 310 to the user. If the expiry date value represents an earlier date and/or time than the reference date value, then the method 200 includes responding to the request with a message indicating access to the second data 310 has expired. The reference date value may be stored in the data processing system 100 or may be obtained from a further data processing system which stores an objective reference date value. In this way, it is possible to allow access to the second data 310 for the user for a limited time. Control over the period of time for which second data 310 is made available to a user is useful in a variety of cases, one such example of this is where the video stream 314 is provided to a user under the condition of a warrant issued by a court. In this case, the court may specify that the video stream is made available to the user, who in this case may be an investigator, for a limited period of time to perform an investigation.

Figure 6:
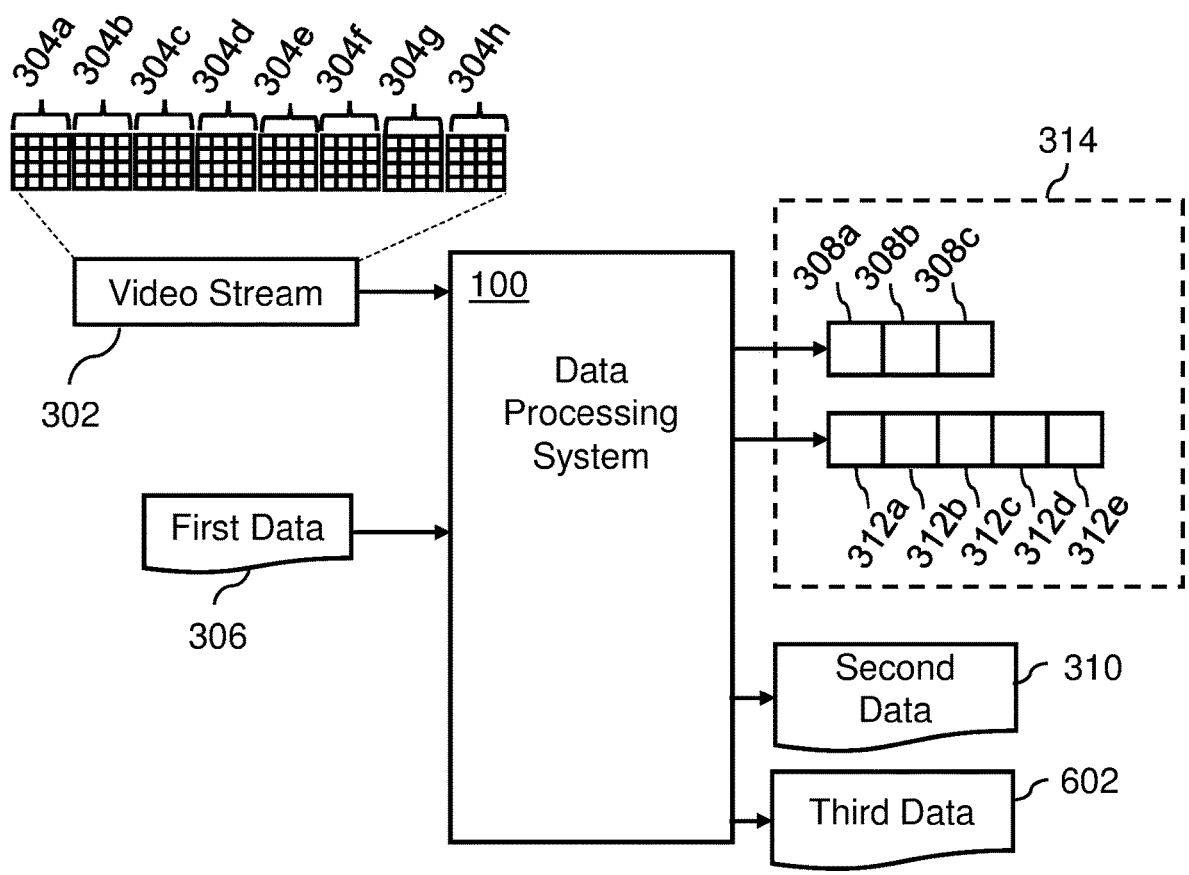
FIG. 6 is a block diagram showing a computer-implemented method for processing a video stream according to examples in which a data processing system generates second and third data for recovering selected portions of data.

The method 200 may further comprise generating third data for use in recovering at least some of the selected portions of the image data from the modified portions of the image data 308a to 308c. FIG. 6 shows an example in which the data processing system 100 generates the third data 602. The third data 602 may be suitable for recovering at least one different selected portion of the image data than can be recovered using the second data 310. To this end the third data 602, like the second data 310, may include differences between certain modified portions of the image data 308a to 308c and selected portions of the image data. For example, the third data 602 may comprise differences to be used to recover a third set of the selected portions of the image data, and the second data 310 may comprise differences to be used to recover the first and/or second sets of the selected portions of the image data, which may be different from the third set of the selected portions. The third data 602 may also be used to recover at least some of the same selected portions as the second data 310, in other words, the third set of selected portions may at least partially overlap with the first and/or second sets of selected portions of the image data.

Generating different second data 310 and third data 602 for use in recovering different selected portions of the image data allows the relevant data for recovering selected portions to be transmitted to the appropriate users, depending on their respective authorization. For example, a first user may be authorised to recover selected portions based on the third data 602, a second user may be authorised to recover selected portions based on the second data 310, and other users may be authorised to recover selected portions based on both or neither of the second data 310 and third data 602. By providing either of the second data 310 or third data 602 to a user depending on their relative authorization, it is possible to reduce the amount of data which is transmitted to users and hence reduce bandwidth requirements. The third data 602 and the second data 310 may be encrypted according to different respective security traits, for example the first security trait and the second security trait described above. Alternatively, or additionally, some parts of the third data 602 may be encrypted according to different security traits than other parts of the third data 602, similar to the examples described above in relation to the second data 310.

The method 200 may further comprise keeping records of when the selected portions of the image data are recovered using the second data 310 and/or which users recovered the selected portions of the image data using the second data 310. As discussed above, the selected portions of the image data may relate to sensitive information which is captured in the video stream 302. Keeping a record of when and by whom the selected portions of the image data are recovered increases the control and security provided by the method 200. To this end, the method 200 may include receiving an indication of a time at which the second data 310 is decrypted and an indication of a user who has accessed the decrypted second data 310. A record may be stored comprising at least an indication of time at which the second data 310 was decrypted and the user who accessed the decrypted second data 310. This indication may be received from a software module or computer program running on the data processing system 100 through which the user is accessing the output video stream 314 or may be received from a separate data processing system which is being operated by the user.

As discussed above in relation to FIG. 6, providing second data 310 and third data 602 which are able to recover different selected portions of the image data allows different versions of the output video stream 314 to be viewed by different users depending on their respective authorization levels. To this end, the method 200 may further comprise providing the modified portions of the image data 308a to 308c, the unselected portions of the image data 312a to 312e, and the second data 310 to a first user and providing the modified portions of the image data 308a to 308c, the unselected portions of the image data 312a to 312e, and the third data 602 to a second user who is different to the first user.

Providing the portions of the image data 308a to 308c and 312a to 312e, and the second data 310 or third data 602 to users in this context may include transmitting this data to respective data processing systems operated by each of the first and second users. Alternatively, providing the portions of image data 308a to 308c and 312a to 312e and the second data 310 or third data 602 may include providing this data via a software module or computer program implemented on the data processing system 100 in dependence on an authority level assigned to each of the first and second users. For example, the first user and the second user may access a computer program on the data processing system 100 using credentials uniquely assigned to them. The data processing system 100 may be configured to provide access to the second data 314 to the first user and the third data 602 to the second user depending on their respective credentials.

It is to be appreciated by one skilled in the art that, while second data 310 and third data 602 have been described above, in some examples there may be further output data for recovering respective selected portions of the image data. For example, the method 200 may comprise generating fourth data, fifth data, and so forth, each of which can be used to recover different selected portions of the image data. In some cases, each recipient of the output video stream 314 may be provided with respective output data which is for use in recovering respective selected portions of the image data from modified portions of the image data 308a to 308c. This allows more granular control over the selected portions which each recipient is able to recover. Any number of the above-mentioned security traits can be used to encrypt the output data which is for use in recovering selected portions of the image data.

It is also to be appreciated by one skilled in the art that, while certain examples described herein relate to methods in which the second data 310 comprises differences between selected portions of the image data and modified portions of the image data 308a to 308c, the second data 310 may instead comprise replacement image data. In one such example the second data 310 comprises replacement pixels for the pixels in the modified portions of the image data 308a to 308c. In this case, the replacement pixels may be generated from the selected portions of the image data, e.g. the replacement pixels may be pixels included in the selected portions of the image data. When recovering the selected portions of the image data, pixels in the modified portions of the image data 308a to 308c may be replaced with the replacement pixels comprised in the second data 310.

Figure 7:
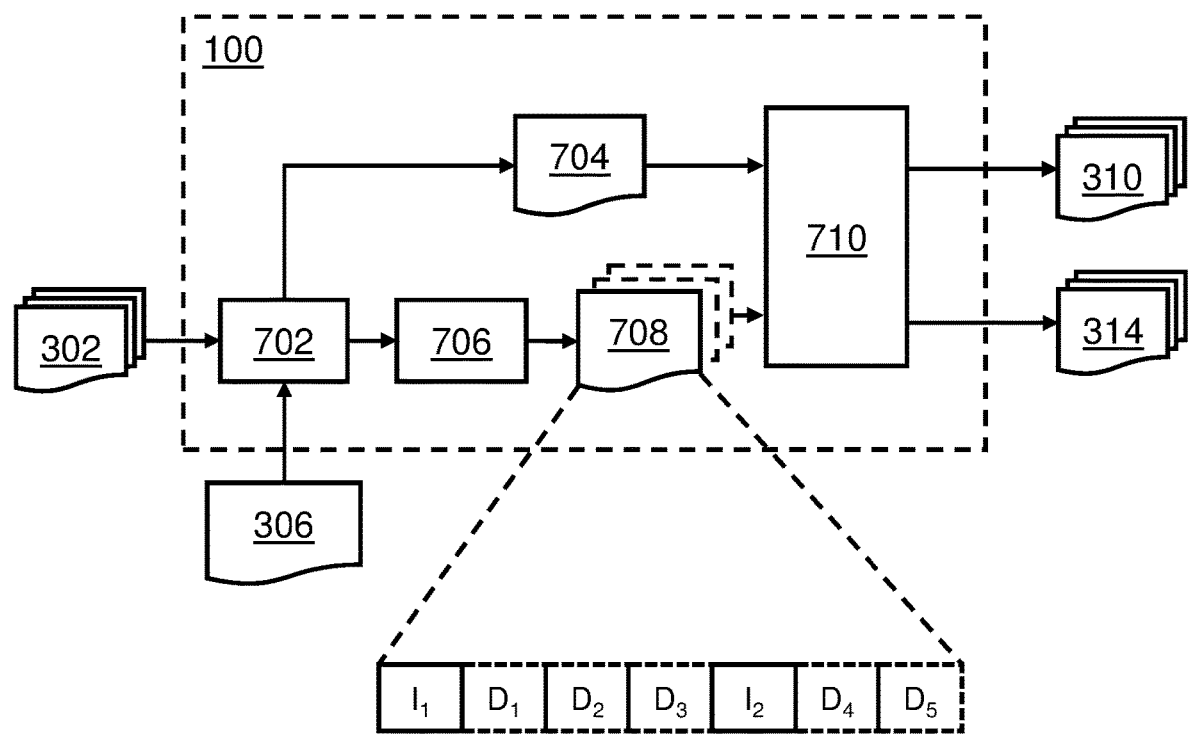
FIG. 7 is a block diagram showing a computer-implemented method for processing a video stream according to examples in which the video stream is encoded before modifying selected portions.

In the examples described above with respect to FIGS. 4 and 5, the selected portions of the image data which are processed to create the modified portions of the image data 308a to 308c are selected for every frame of the image data in which the sensitive information to be removed is present. However, in other examples, it may be sufficient to modify a subset of the plurality of frames of the image data that include the sensitive information which is to be removed. That is to say, the selected portions of the image data may correspond to a subset of the plurality of frames of image data 304a to 304h in the video stream 302 even when more frames of the image data in the video stream 302 contain the sensitive information. The examples described in relation to FIGS. 4 and 5 rely on modifying the selected portions of the image data before encoding the unselected portions of the image data 312a to 312e and modified portions of the image data 308a to 308c. FIG. 7 shows an example of the method 200 in which portions of the image data are selected and the video stream is encoded before modifying the selected portions of the image data.

FIG. 7 shows a first module 702 for selecting portions of the image data in the input video stream 302 on the basis of the first data 206. The selected portions of the image data are identified in selection data 704 representing at least some of the selected portions of the image data. The video stream 302 is encoded at a module 706 to generate an encoded video stream 708. In some video encoding standards, such as the H.264 video encoding standard, an encoded video stream may include a set of index frames of image data $I_1$ and $I_2$, representing a subset of the plurality of frames of image data in the input video stream 302, and a set of intermediate frames of image data $D_1$ to $D_5$ The intermediate frames of image data $D_1$ to $D_5$ each include a set of difference vectors representing the differences between an index frame of image data $I_1$ and the respective intermediate frame of image data $D_1$ to $D_3$ before the next sequential index frame 12. In the example shown in FIG. 7 there are two index frames $I_1$ and $I_2$ and between each index frame there are intermediate frames of image data $D_1$ to $D_5$ represented by the set of difference vectors. This allows a reduced amount of image data to be included in the encoded video stream, while allowing the original video stream to be recovered. This is because parts of the images which don't change between the frames of image data do not need to be included in the intermediate frames of image data $D_1$ to $D_5$ thereby reducing the amount of data included in the encoded video stream to represent certain frames of image data.

The index frames $I_1$ and $I_2$ are used periodically and, in some cases, may be used for specific frames of image data where the amount of difference between the specific frame of image data and a previous, most recent, index frame exceeds a predetermined threshold. At a module 710, the data processing system 100 uses the selection data 704 to modify the selected portions of the image data in the encoded video stream 708. In this case, modifying the selected portions of the image data includes modifying selected portions of the image data in the index frames $I_1$ and $I_2$ and not in the intermediate frames of image data $D_1$ to $D_5$ Modifications made to an index frame of image data $I_1$ and $I_2$ by introducing noise or replacing pixel values will cause subsequent frames of image data, represented at $D_1$ to $D_5$, between the index frames of image data to also include these modifications when the encoded video stream is decoded. This is because the data values included in the frames of image data which are not the index frames specify differences between the given frame and an index frame rather than defining absolute data values which can be processed individually. By modifying the selected portions of the image data in the index frames $I_1$ and $I_2$ it allows fewer modifications to be made whilst still causing the sensitive information to be redacted in the output video stream 314.

Figure 8:
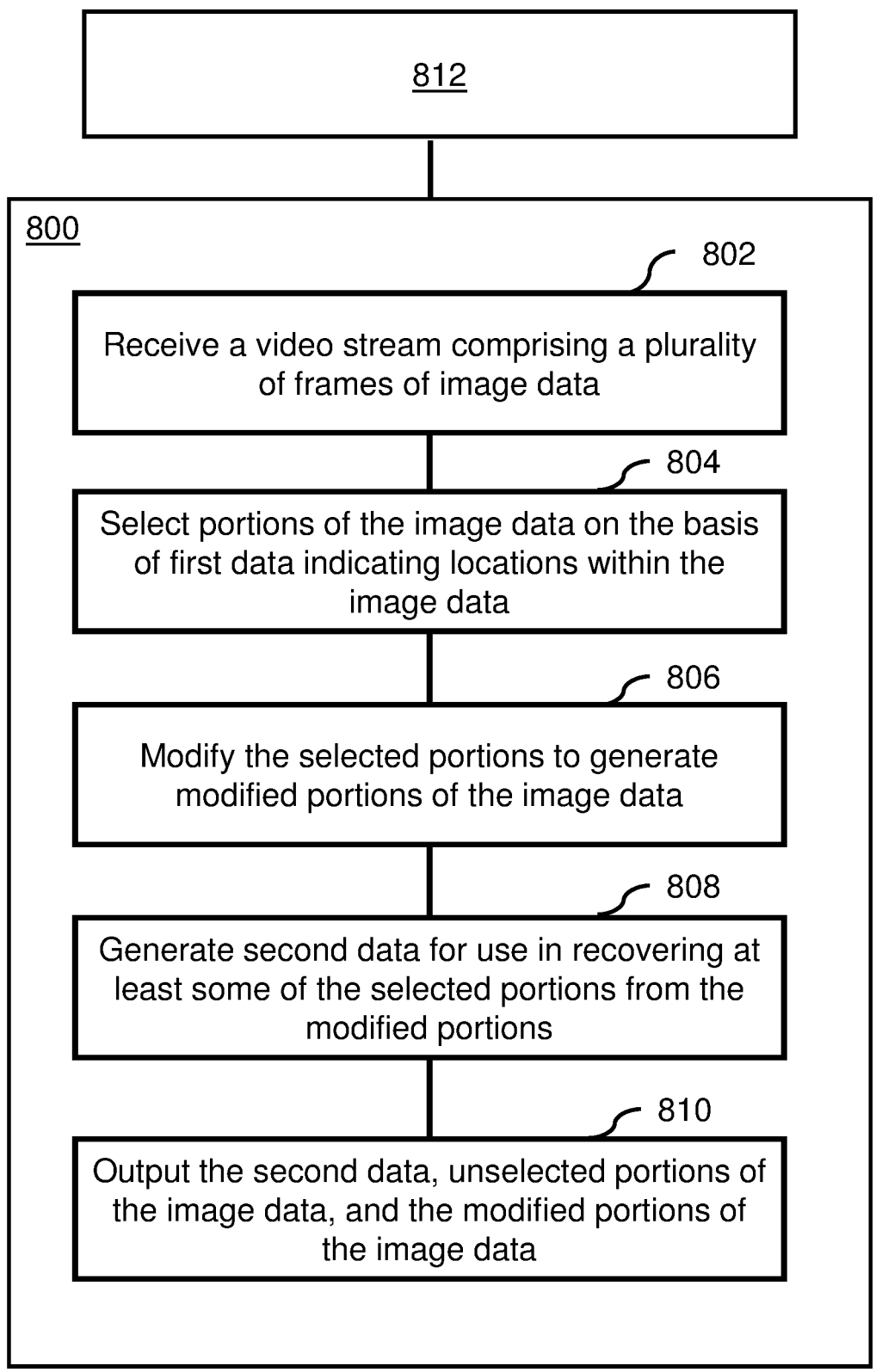
FIG. 8 is a schematic block diagram showing a non-transitory computer-readable storage medium comprising computer-executable instructions according to examples.

In some cases, the sensitive information in the plurality of frames of image data which is to be removed by modifying selected portions of the image data relates to objects or people which are stationery in the scene captured in the video. In this case the method described with respect to FIG. 7 provides an efficient way of redacting the video stream without requiring that every frame of image data is processed. However, in other cases sensitive information, such as images of people in the video stream 302 may move between successive frames of image data. As such it may be desirable to increase the number of index frames $I_1$ and $I_2$ in the encoded video stream 708 such that the sensitive information which is to be redacted can be tracked between successive frames. The second data 310 is generated at the module 710 in a similar manner to the examples described in relation to FIGS. 4 and 5. That is to say the second data 310 may be derived from difference data, or may include the selected portions of the image data which are modified. FIG. 8 shows a non-transitory computer-readable storage medium 800 comprising computer-executable instructions 802 to 812 which, when executed by at least one processor 814, causes the at least one processor 814 to perform the computer-implemented method 200 according to any of the examples described above.

Figure 9:
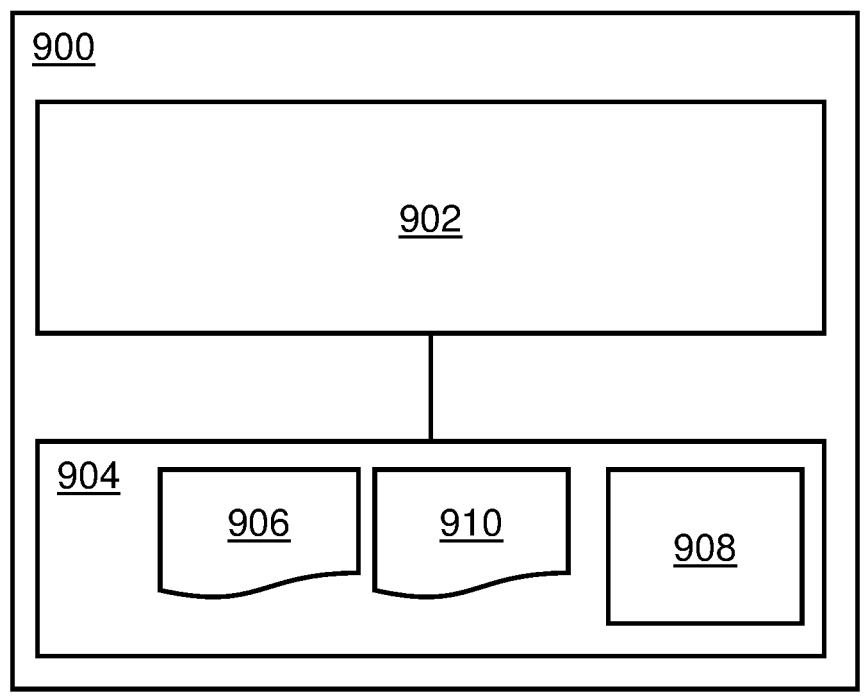
FIG. 9 is a schematic block diagram showing a data processing system for processing image data according to examples.

FIG. 9 shows a data processing system 900 for image processing, which allows a user to recover the selected portions of the image data. The data processing system 900 comprises at least one processor 902 and storage 904. The at least one processor 902 and the storage 904 include any suitable processor and storage combinations such as those described above in relation to the data processing system 100 shown in FIG. 1. The data processing system 900 may be implemented as a single device or across multiple devices as a distributed data processing system 900. For example, the data processing system 900 may be included as part of a cloud computing network which is accessible to a plurality of users through a local or wide area network.

Figure 10:
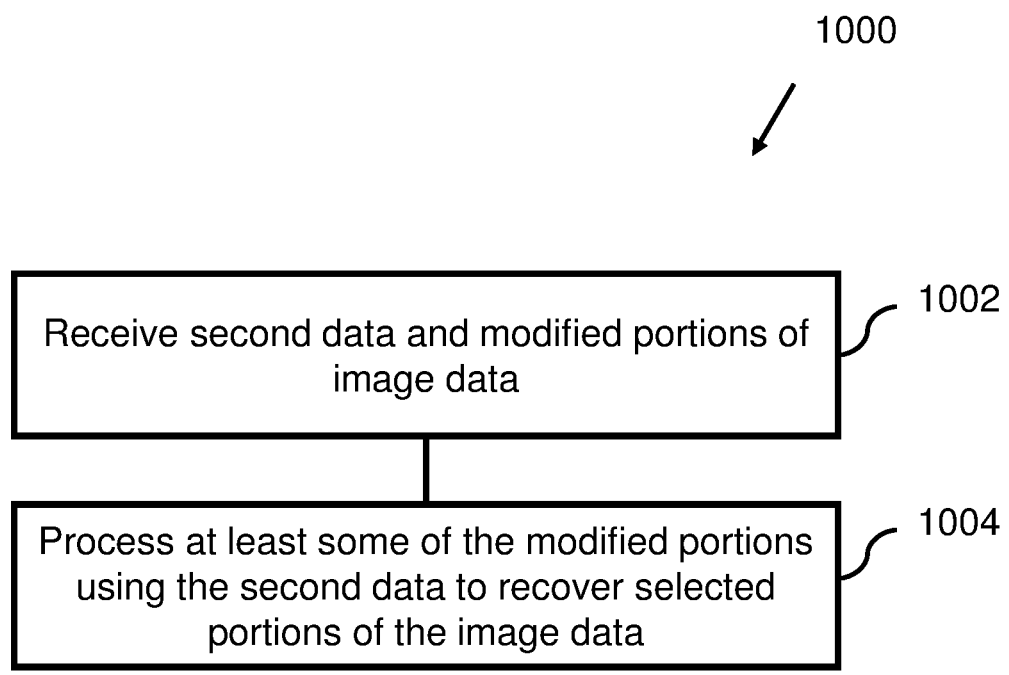
FIG. 10 is a flow chart showing a computer-implemented method for image processing according to examples.
Figure 11:
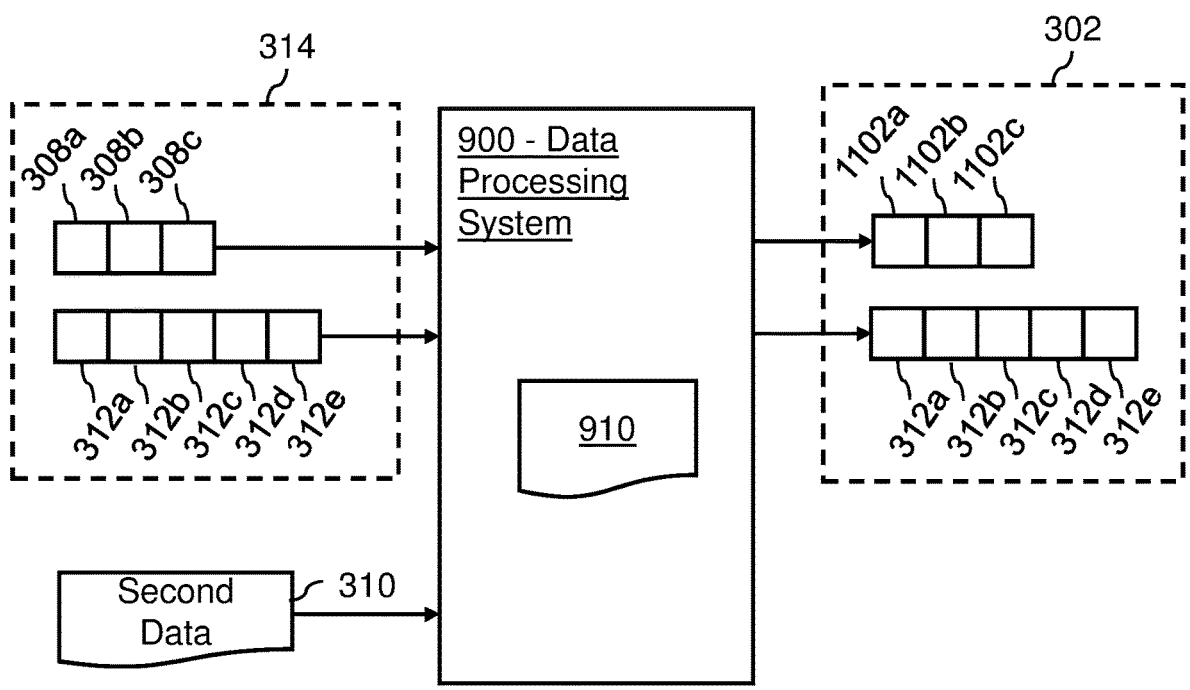
FIG. 11 is a block diagram illustrating a computer-implemented method for data processing according to examples.
Figure 12:
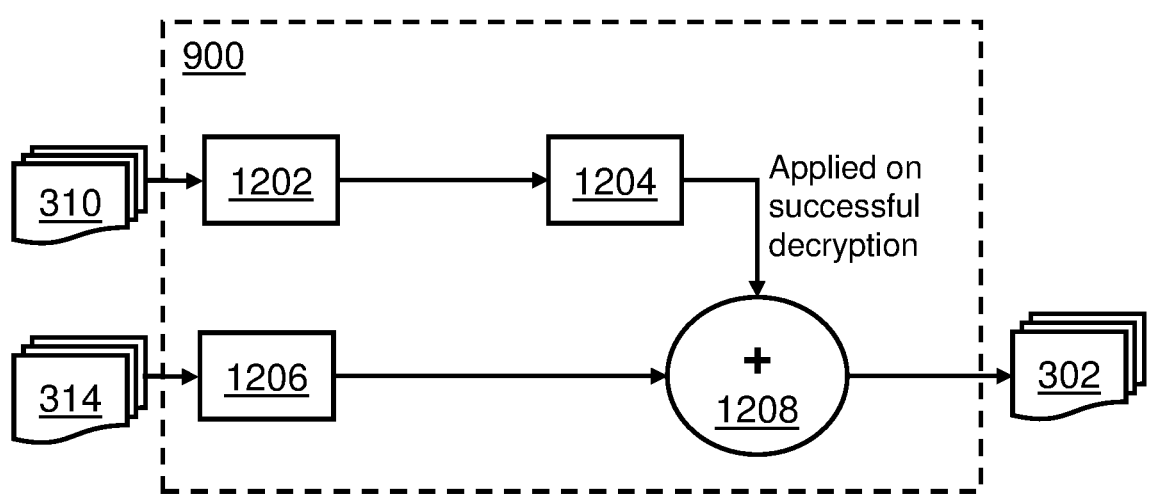
FIG. 12 is block diagram showing a process of recovering selected portions of the image data from the modified portions of the image data according to examples.
Figure 13:
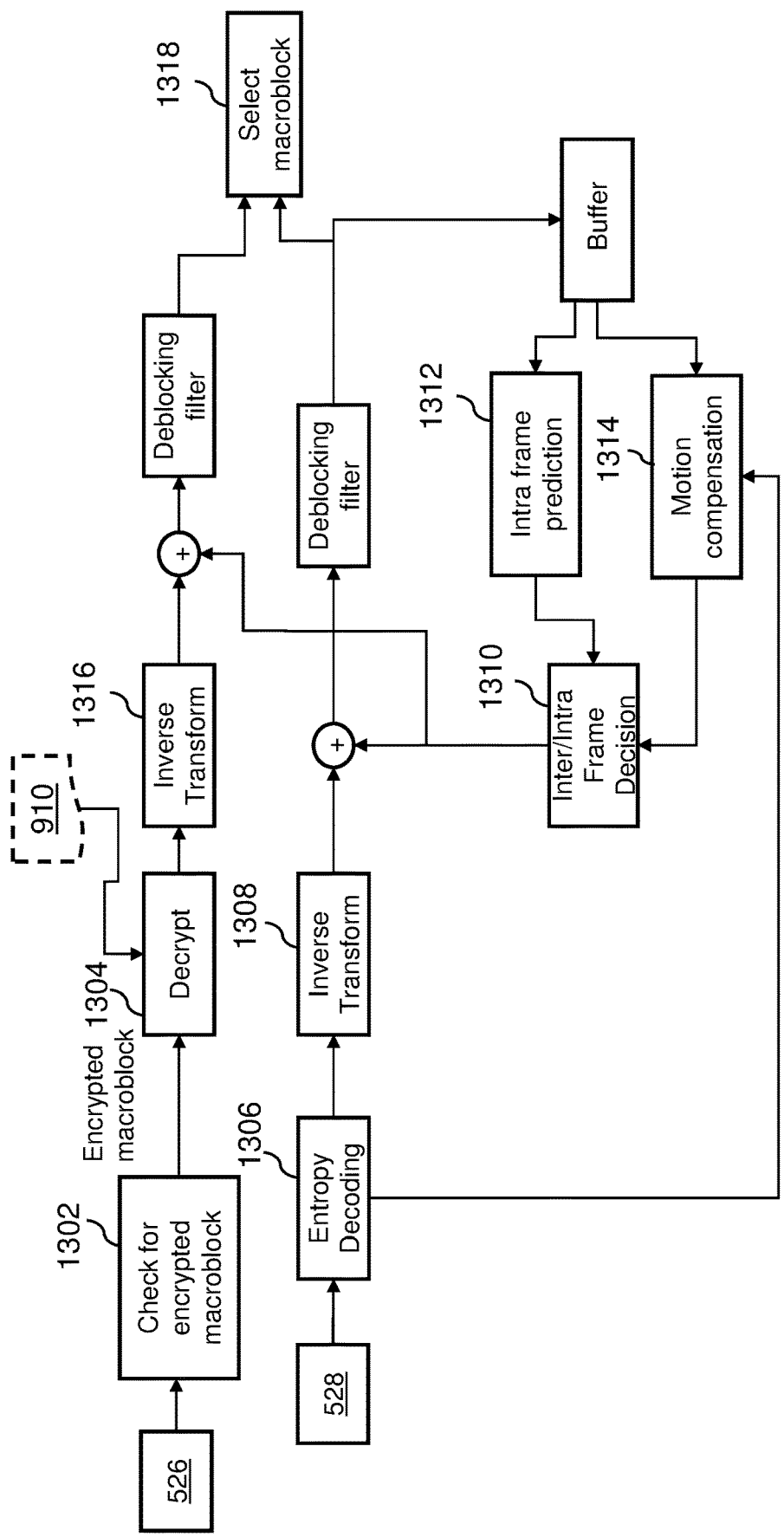
FIG. 13 is a block diagram showing a process of recovering selected portions of the image data from the modified portions of the image data according to examples which are different to those shown in FIG. 12.

The storage 904 comprises computer-readable instructions 906 which, when executed by the processor 902 cause the processor 902 to perform a method 1000 for processing image data, which will now be described with reference to FIGS. 10 to 13. FIG. 10 shows a flow diagram illustrating the computer-implemented method 1000, and FIGS. 11 to 13 show block diagrams of example implementations of the computer-implemented method 1000. The method 1000 involves, at a first block 1002, receiving second data 310, including for example, differences between the modified portions of the image data 308a to 308c and the selected portions of the image data, and modified portions of image data 308a to 308c generated according to the examples described in relation to any of FIGS. 1 to 6. At a second block 1004, the method involves processing at least some of the modified portions 308a to 308c using the second data 310, e.g. the differences, to recover selected portions of the image data 1102a to 1102c The second data 310 and the modified portions of the image data 308a to 308c may be received in the form of a video stream, such as the output video stream 314. In this case, the data processing system 900 comprises a decoder 908 for decoding the video stream. In examples where at least part of the second data 310 is encrypted, processing the modified portions of the image data 308a to 308c involves using encryption key data 910 to decrypt the at least part of the second data 310 which is encrypted. Where the data processing system 900 receives the output video stream 314, the data processing system 900 may be further configured to reconstruct the original video stream 302. For example the data processing system 900 may recover the selected portions 1102a to 1102c, using the modified portions of the image data 308a to 308c and the second data 310, and reconstruct the video stream 302 using the unselected portions 312a to 312e and the selected portions 1102a to 1102c which have been recovered.

As described above, different parts of the second data 310 may be encrypted according to different security traits. The encryption key data 910 may represent a plurality of encryption keys each of which may be associated with a security trait, such that each of the encryption keys enables a different part of the second data 910 to be decrypted. Different users may be provided access to different sets of encryption keys based on an authorization associated with that user. For example, each user may be provided with an account (or log-in) which enables them to access none, some, or all of the encryption key data 910 to decrypt respective parts of the second data 310.

The data processing system 900 may be included in a device which comprises other components suitable for processing a video stream and displaying a video. For example, a computing device comprising the data processing system 900 may be configured to reconstruct the original video stream 302 from the unselected portions of image data 312a to 312e of the output video stream 314, selected portions of the image data, recovered using the data processing system 900, and in some cases at least one of the modified portions of the image data 308a to 308c. The computing device may comprise any suitable display devices, video codecs, and so forth in order to display the reconstructed video to a user. In examples where a user does not have access to encryption key data 910, e.g. due to not having the relevant authorization, the data processing system 900, or a computing device comprising the data processing system 900, may still be able to show the output video stream 314 to the user, for example by decoding and processing the output video stream 314. However, the modified portions of the image data 308a to 308c will be displayed instead of the selected portions of the image data. In other words, a user without access to the encryption key data 910 will be able to view only a modified version, e.g. a redacted version, of the original video stream 302.

Where the second data 310 includes metadata comprising an expiry date value, the method 1000, implemented by the data processing system 900, may include obtaining a reference date value and comparing the reference date value to the expiry date value to determine whether the second data 310 can validly be used to recover the selected portions of the image data from the modified portions of the image data 308a to 308c. That is to say, processing at least some of the modified portions of the image data 308a to 308c using the second data 310 to recover the selected portions of the image data is conditional on the reference date value representing an earlier date and/or time than the expiry date value. In this way, the second data 310 is configured to expire, such that attempts by users to access the unredacted video stream 310 by recovering the selected portions of the image data can be restricted to a limited period of time.

Obtaining the reference date value may including reading the reference date value from storage at the data processing system 900, wherein the data processing system maintains a reference date value representing a current date and/or time. Alternatively, the reference date value may be requested from a remote computing device which is separate to the data processing system 900. For example, the reference date value may be obtained from an independent third-party computing system which stores an objective indication of the current date and/or time. Obtaining the reference date value from a remote computing device allows an objective determination to be made as to whether access to the second data 310 has expired. This in turn increases security by preventing users from circumventing the expiry date of the second data 310 by modifying the date and/or time stored at the data processing system 900.

In the example shown in FIG. 12, the data processing system 900 is configured to process the output video stream 314 and second data 310 as generated according to the examples described above in relation to FIG. 4. In other words, in the examples shown in FIG. 12, the data processing system 900 uses standards compliant decoding techniques, e.g. decoding techniques implemented by a general H.264 decoder. The encoded and encrypted second data 310, e.g. comprising differences between the selected portions of the image data and the modified portions of the image data 308a to 308c, is received and provided to a decrypting block 1202 where is it is decrypted e.g. using encryption key data 910. The decrypted second data 310 is then forwarded to a decoder, e.g. a standards compliant decoder, where it is decoded. The output video stream 314 is received and decoded at a decoder 1206, e.g. a standards compliant decoder. The decoded output video stream 314 and the decrypted and decoded second data 310 are then combined at block 1208. For modified portions of the image data 308a to 308c in the video stream 314, the differences included in the second data 310 are used to recover the selected portions of the image data. By combining the second data 310 and the output video stream 314 in this way the original video stream 302 may be reconstructed.

As described above, in some examples, different parts of the second data 310 may be encrypted according to different security traits. In this case, the data processing system 900 may be configured to decrypt 1202 only part of the second data 310. Accordingly, parts of the second data 310, e.g. differences between selected portions and modified portions of the image data 308a to 308c, which remain encrypted after the decryption block 1202, may not be combined 1208 with the output video stream 314. As such, in some examples only a subset of the selected portions of the image data may be recovered. Where the data processing system 900 does not have access to any encryption key data 910, the differences in the second data 900 may not be combined with the output video stream 314. Hence, the data processing system may only decode 1206 the output video stream 314 to be displayed using a suitable media player.

The block diagram shown in FIG. 13 relates to examples of the method 1000 in which modifications are made to standards compliant decoding methods, in particular, where the selected portions of the image data are macroblocks, as described above in relation to FIG. 5.

In the example shown in FIG. 13, an encrypted data packet 526, comprising second data 310, and an encoded modified macroblock 528 are received. At a first block 1302 the data processing system 900 determines whether there is an encrypted macroblock in the encrypted data packet 526. If there is an encrypted macroblock then then the encrypted macroblock is provided to a decryption block 1304 where it is decrypted, dependent on there being suitable encryption key data 910 available.

The encoded modified macroblock 528 is decoded using a process which is similar to standards-compliant techniques as specified in the H.264 AVC standard. In this example, the use of techniques such as entropy decoding 1306, inverse transforming 1308, and generating inter/intra frame decisions 1310, based on intra frame predictions 1312 and motion compensation 1314, are used to decode the encoded modified macroblock 528. Similarly, the decrypted output of block 1304 is inversely transformed 1316 and the selected macroblock is recovered based on the decoding techniques described above and the decrypted output of block 1304, e.g. differences between the selected macroblock and a respective modified macroblock. At a final block 1318 a selection is made between the selected macroblock, generated based on the encrypted data packet 526, and a decoded modified macroblock, based on the encoded modified macroblock 528. Generally, where a recovered selected macroblock is available it is selected at 1318. If no recovered selected macroblock is available, for example, where the encryption key data 910 is not suitable or the encrypted data packet 526 does not include differences between some of the selected macroblocks and the modified macroblocks, then the decoded modified macroblock is selected and output at 1318. In this way, a user may be provided with an unredacted, or at least partially redacted, version of the original video stream 302 depending on encryption key data 910 which is available to the data processing system 900.

Where the video stream 302 is processed according to the examples shown in FIG. 7, processing at least some of the modified portions using the second data to recover selected portions of the image data is performed before decoding the output video stream 314. In this way, the modifications made to the index frames $I_1$ and $I_2$ are reversed before decoding the video stream 314 such that the information recovered in the index frames $I_1$ and $I_2$ enable the sensitive information to also be recovered in the intermediate frames $D_1$ to $D_5$.

Figure 14:
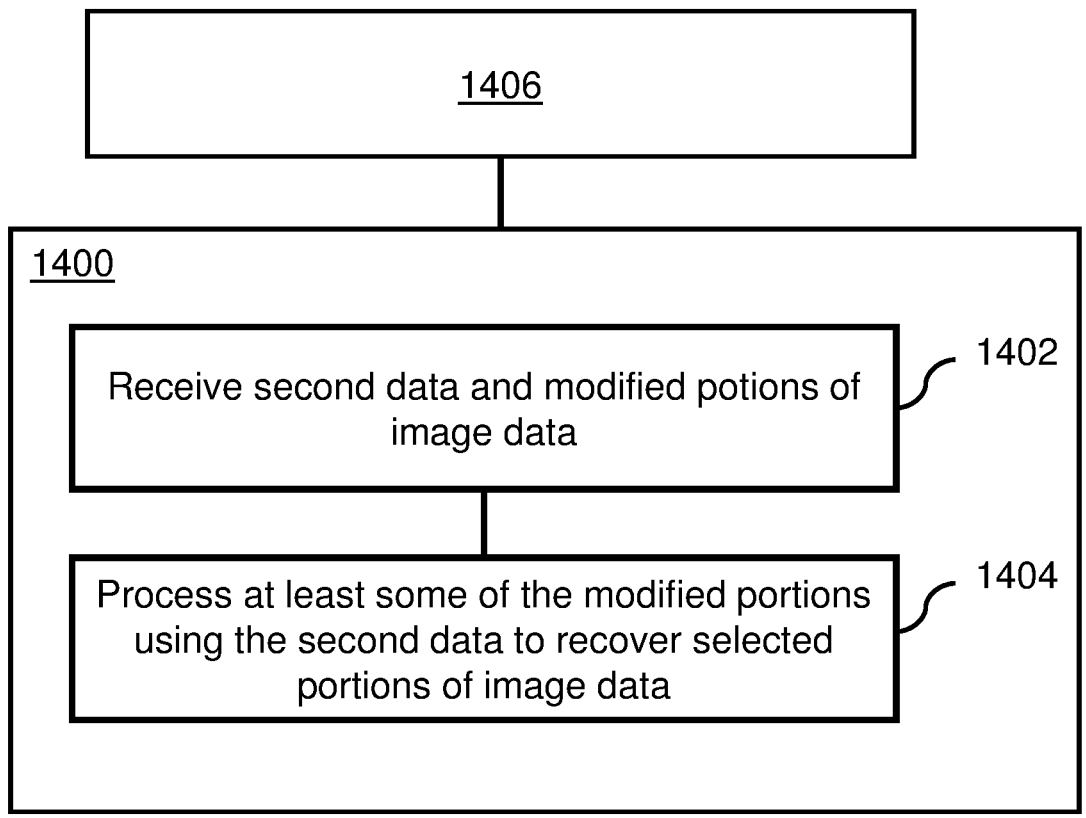
FIG. 14 is a schematic block diagram showing a non-transitory computer-readable storage medium comprising computer-executable instructions according to examples.

FIG. 14 shows a non-transitory computer-readable medium 1400 comprising computer-executable instructions 1402 and 1404 which when executed by at least one processor 1406, cause the at least one processor 1406 to perform a method 1000 described above in relation to FIG. 10.

Figure 15A:
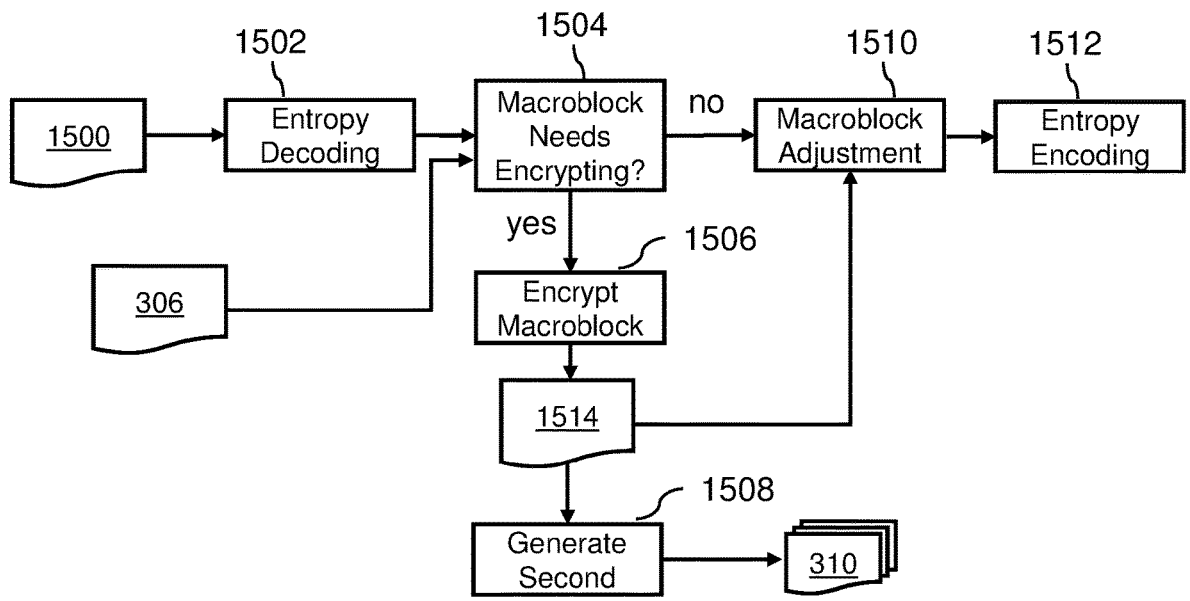
FIG. 15A is a schematic block diagram showing a method of processing a video stream according to examples in which modifying selected portions of the image data comprises encrypting the selected portions.

While the examples described above relate to the modification of the selected portions of the image data by blurring, replacing, and/or redacting the selected portions of the image data, other examples are also envisaged. One such alternative comprises the use of encryption methods to modify the selected portions of the image data. FIG. 15A shows a block diagram of a method, which may be performed by the data processing system 100 shown in FIG. 1, in which modifying the selected portions of the image data comprises encrypting the selected portions of the image data. An encoded macroblock 1500 of image data is received and entropy decoded at block 1502. At block 1504, first data 306 is used to determine whether the macroblock 1500 of image data should be selected. If the macroblock 1500 is selected, then it is forwarded to block 1506 where it is modified by being encrypted, to generate a modified macroblock 1514. The selected macroblock 1500 may be encrypted according to a specific security trait, for example using a specific set of one or more encryption keys. In some examples, each selected macroblock is encrypted using a unique set of one or more encryption keys. Second data 310, indicating a location of the selected macroblock 1500 with respect to unselected macroblocks, is generated at block 1508. As encoding macroblocks relies on predictions generated from neighbouring macroblocks, adjustments are made at macroblock adjustment block 1510, to correct for errors which may otherwise be introduced by attempting to generate macroblock predictions from encrypted macroblocks, before the modified macroblock 1514 and neighbouring macroblocks are entropy encoded at block 1512.

Figure 15B:
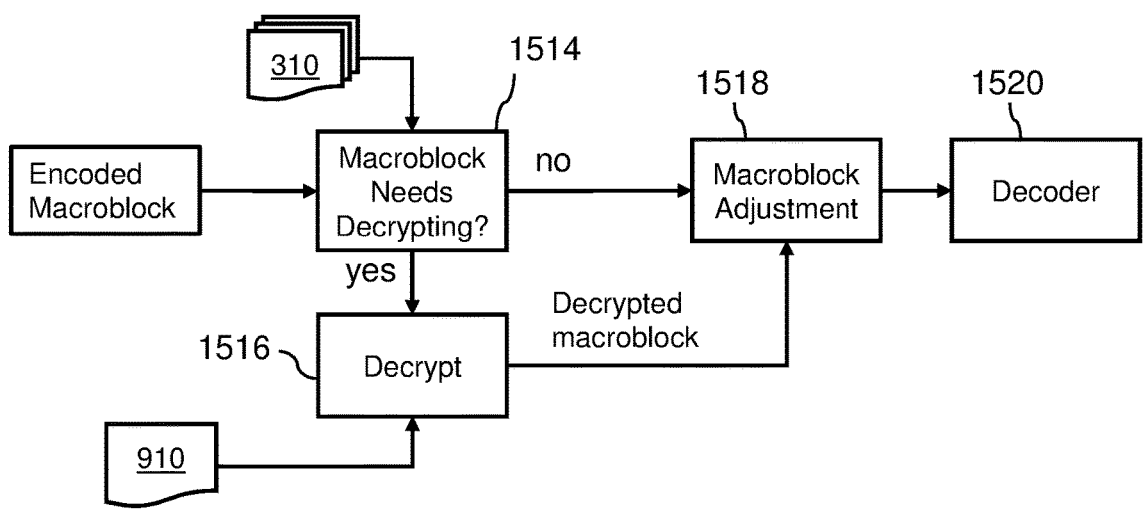
FIG. 15B is a schematic block diagram showing a method of processing image data according to examples in which selected portions of the image data are recovered using second data to decrypt the modified portions of the image data.

FIG. 15B shows a block diagram of a method of recovering the selected portions of the image data, in this case macroblocks, from the output of the method illustrated in FIG. 15A. The method illustrated in FIG. 15B may be performed by the data processing 900 shown in FIG. 9. Encoded macroblocks are received and location information, included in the second data 310, is used at block 1514 to determine which encoded macroblocks are to be decrypted.

If a received encoded macroblock is to be decrypted, then it is forwarded to block 1516 where it is decrypted using encryption key data 910. Encoded macroblocks which are not to be decrypted, e.g. unencrypted macroblocks, are forwarded to a macroblock adjustment block 1518 which also receives the decrypted macroblocks. Adjustments are made between the decrypted macroblocks and those which are not to be decrypted and the output of this stage is forwarded to a decoder 1520, which decodes the macroblocks such that they can be viewed in a media player.

Where modifying macroblocks comprises encrypting the macroblocks, adjustments to the encoding process may be made to mitigate changes in noise and errors which may be introduced. Errors can occur when trying to use encrypted macroblocks, which cannot be read, when generating predictions for encoding neighbouring macroblocks. Adjusting the encoding process can prevent such errors from arising and may include, for example, using the first data 306 to inform motion estimation operations included in an encoding process to adjust for errors introduced by the use of encrypted macroblocks, e.g. when performing motion estimation the adjustment may include restricting the selection of modified macroblocks when performing motion estimation. The first data 306 may also be used to compensate for the encrypted macroblocks in an inter/intra frame prediction decision as discussed above in relation to FIG. 5.

The processing of at least some of the modified portions of the image data 308a to 308c using the second data 310 may be performed in response to a request from a user. In this case, the method 1000 implemented by the data processing system 900 may further comprise storing a record which includes an indication of a time at which the modified portions of the image data 308a to 308c are processed using the second data 310 and an indication of the user. In this way, an audit trail of users which have recovered the selected portions of the image data may be maintained which increases the security and accountability of the users.

The above examples are to be understood as illustrative examples of the invention. Further examples of the invention are envisaged. For example, while the above examples are described in relation to the H.264 AVC standard it will be appreciated that the methods and systems described herein may be modified to operate according to any suitable compression methods and/or standards. Further, portions of image data may be selected at different levels, such as multiple frames of image data at a time.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

Numbered Clauses

The following numbered clauses described various embodiments of the present disclosure.

1. A computer-implemented method for processing a video stream, the computer-implemented method comprising:
receiving a video stream comprising a plurality of frames of image data;
selecting portions of the image data on the basis of first data indicating locations within the image data;
modifying the selected portions to generate modified portions of the image data; generating second data for use in recovering at least some of the selected portions from the modified portions; and
outputting the second data, unselected portions of the image data and the modified portions of the image data.

2. A computer-implemented method according to clause 1, wherein the video stream is a first video stream, the plurality of frames of image data is a first plurality of frames of image data, and outputting the modified portions of the image data and the unselected portions of image data comprises generating a second video stream, the second video stream comprising a second plurality of frames of image data, wherein the second plurality of frames of image data includes the modified portions of the image data and the unselected portions of the image data.

3. A computer-implemented method according to clause 2, wherein the second plurality of frames of image data does not include the selected portions of the image data.

4. A computer-implemented method according to clause 2 or clause 3, wherein the second data comprises metadata representing locations of each of the modified portions of the image data in the second video stream.

5. A computer-implemented method according to any of clauses 2 to 4, wherein the second data is embedded in the second video stream.

6. A computer-implemented method according to any of clauses 2 to 5, wherein generating the second video stream comprises encoding the second plurality of frames of image data using an H.264 Advanced Video Compression Standard.

7. A computer-implemented method according to clause 1, wherein the method further comprises:
encoding the video stream to generate an encoded video stream comprising:
a set of one or more index frames of image data; and
a set of one or more intermediate frames of image data, wherein the intermediate frames each include a set of difference vectors representing differences between the intermediate frame and at least one index frame; and
wherein modifying the selected portions to generate the modified portions of the image data is performed after encoding the video stream, and
wherein the selected portions which are modified are included in the set of one or more index frames and are not included in the set of one or more intermediate frames.

8. A computer-implemented method according to clause 7, wherein the second data comprises metadata representing locations of each of the modified portions of the image data in the encoded video stream.

9. A computer-implemented method according to clause 7 or clause 8, wherein the second data is embedded in the encoded video stream.

10. A computer-implemented method according to any one of clauses 7 to 9, wherein the video stream is encoded using an H.264 Advanced Video Compression Standard.

11. A computer-implemented method according to any preceding clause, in which the second data comprises a network abstraction layer packet, and the computer-implemented method comprises encoding the second data using an H.264 Advanced Video Compression Standard.

12. A computer-implemented method according to any preceding clause, further comprising encrypting the second data.

13. A computer-implemented method according to clause 12, wherein the second data is encrypted according to a single-use encryption key.

14. A computer-implemented method according to clause 12 or clause 13, wherein the second data comprises metadata indicating that the second data is available for a single use to recover at least some of the selected portions of the image data.

15. A computer-implemented method according to any one of clauses 12 to 14, wherein the second data comprises metadata representing an expiry date value for the second data.

16. A computer-implemented method according to clause 15, wherein the method further comprises:
  providing the modified portions of the image data and the unselected portions of the image data to a user at a first time; and
  at a second time, the second time being after the first time:
    receiving a request to provide the second data to the user;
comparing the expiry date value for the second data with a reference date value; and
performing a predetermined action in dependence on the comparison of the expiry date value with the reference date value.

17. A computer-implemented method according to clause 16, wherein when the expiry date value represents a later date and/or time than the reference date value the method comprises providing the second data to the user.

18. A computer-implemented method according to clause 16 or 17, wherein when the expiry date value represents an earlier date and/or time than the reference date value the method comprises responding to the request with a message indicating that access to the second data has expired.

19. A computer-implemented method according to clause 12, wherein the second data represents, for at least one of the selected portions of the image data, a difference between the selected portion of the image data and a respective modified portion of the image data.

20. A computer-implemented method according to any one of clauses 12 to 19, wherein the second data comprises the selected portions of the image data.

21. A computer-implemented method according to any one of clauses 12 to 20, comprising generating third data for use in recovering at least some of the selected portions of the image data from the modified portions of the image data, wherein the third data is for use in recovering at least one different selected portion of the image data than is recovered using the second data.

22. A computer-implemented method according to clause 21, further comprising:
  providing the second data, the modified portions of the image data, and the unselected portions of the image data to a first user; and
  providing the third data, the modified portions of the image data, and the unselected portions of the image data to a second user, the second user being different to the first user.

23. A computer-implemented method according to clause 21 or clause 22, wherein the second data is encrypted according to a first security trait, and the computer-implemented method further comprises encrypting the third data according to a second security trait.

24. A computer-implemented method according to any one of clauses 12 to 20, wherein the second data is encrypted by encrypting a first part of the second data according to a first security trait and encrypting a second part of the second data according to a second security trait.

25. A computer-implemented method according to clause 24, wherein the first and second parts of the second data are different parts of the second data.

26. A computer-implemented method according to any one of clauses 23 to 24, wherein the first security trait is associated with a first set of one or more encryption keys, and the second security trait is associated with a second set of one or more encryption keys, wherein the first set and the second set are different sets of encryption keys.

27. A computer-implemented method according to any of clauses 1 to 11, wherein modifying the selected portions comprises encrypting the selected portions of the image data.

28. A computer-implemented method according to any one of clauses 12 to 24, the computer-implemented method further comprising:
  receiving an indication of a time at which the second data is decrypted and a user who has accessed the decrypted second data; and
  storing a record comprising at least the indication of the time at which the second data was decrypted and the user who accessed the decrypted second data.

29. A computer-implemented method according to any previous clause, further comprising generating the first data indicating locations within the image data by processing the plurality of frames of the image data using an artificial neural network to identify at least one predetermined class of object represented by the image data.

30. A data processing system for processing a video stream comprising:
  at least one processor; and
  storage comprising computer-executable instructions which, when executed by the at least one processor, cause the at least one processor to perform a computer-implemented method according to any preceding clause.

31. A data processing system according to clause 30, further comprising an object detection module for detecting a predetermined class of objects represented by the image data to generate the first data.

32. A data processing system according to any of clauses 30, wherein the storage comprises the first data, and wherein the computer-executable instructions, when executed by the at least one processor, further cause the at least one processor to access the storage to obtain the first data.

33. A non-transitory computer-readable storage medium comprising computer-executable instructions which, when executed by at least one processor, cause the at least one processor to perform a computer-implemented method according to any of clauses 1 to 16.

34. A computer-implemented method for data processing, the computer-implemented method comprising:
receiving second data and modified portions of image data generated using a computer-implemented method according to any of clauses 1 to 31; and
processing at least some of the modified portions using the second data to recover selected portions of the image data.

35. A computer-implemented method according to clause 34, wherein at least part of the second data is encrypted, and wherein processing the modified portions using the second data comprises using encryption key data to decrypt the at least part of the second data which is encrypted.

36. A computer-implemented method according to clause 35, wherein the at least part of the second data is encrypted using a single-use encryption key.

37. A computer-implemented method according to clause 34, wherein at least part of the modified portions of image data are encrypted, and wherein processing the modified portions using the second data comprises using encryption key data to decrypt the at least part of the modified portions of image data which are encrypted.

38. A computer-implemented method according to any one of clauses 34 to 37, wherein the second data comprises metadata including an expiry date value for the second data, and wherein the computer-implemented method comprises:
obtaining a reference date value; and
comparing the reference date value to the expiry date value,
wherein the processing of at least some of the modified portions using the second data to recover selected portions of the image data is conditional on the reference data value representing an earlier date and/or time than the expiry data value.

39. A computer-implemented method according to clause 38, wherein obtaining a reference date value comprises requesting a reference date value from a remote computing device.

40. A computer-implemented method according to any of clauses 34 to 39, wherein the processing of at least some of the modified portions using the second data is performed in response to a request from a user, and wherein the computer-implemented method further comprises storing a record, the record including at least:
an indication of a time at which the modified portions of the image data are processed using the second data; and
an indication of the user.

41. A data processing system for processing image data comprising:
at least one processor; and
storage comprising computer-executable instructions which, when executed by the at least one processor, cause the at least one processor to perform a method according to any of clauses 34 to 40.

42. A non-transitory computer-readable storage medium comprising computer-executable instructions which, when executed by at least one processor, cause the at least one processor to perform a computer-implemented method according to any of clauses 34 to 40.

The invention claimed is:

1. A computer-implemented method for processing a video stream, the computer-implemented method comprising:
receiving a video stream comprising a plurality of frames of image data;
selecting portions of the image data on the basis of first data indicating locations within the image data;
modifying the selected portions to generate modified portions of the image data;
generating second data for use in recovering at least some of the selected portions from the modified portions, the second data comprising metadata representing an expiry date value for the second data, the expiry date value indicating a date and/or time at which access to the second data is to expire;
outputting the second data, unselected portions of the image data and the modified portions of the image data;
providing the modified portions of the image data and the unselected portions of the image data to a user at a first time by transmitting the modified portions of the image data and the unselected portions of the image data to a data processing system operated by the user; and
at a second time, the second time being after the first time:
receiving a request to provide the second data to the user;
comparing the expiry date value for the second data with a reference date value; and
performing a predetermined action in dependence on the comparison of the expiry date value with the reference date value,
wherein if it is determined that the expiry date value represents a later date and/or time than the reference date value based on the comparison, the predetermined action comprises providing the second data to the user by transmitting the second data to the data processing system operated by the user.

2. The computer-implemented method according to claim 1, wherein the video stream is a first video stream, the plurality of frames of image data is a first plurality of frames of image data, and outputting the modified portions of the image data and the unselected portions of image data comprises generating a second video stream, the second video stream comprising a second plurality of frames of image data, wherein the second plurality of frames of image data includes the modified portions of the image data and the unselected portions of the image data.

3. The computer-implemented method according to claim 2, wherein the second data comprises metadata representing locations of each of the modified portions of the image data in the second video stream.

4. The computer-implemented method according to claim 1, wherein if it is determined that the expiry date value represents a later date and/or time than the reference date value based on the comparison, the predetermined action comprises providing the second data to the user.

5. The computer-implemented method according to claim 1, wherein if it is determined that the expiry date value represents an earlier date and/or time than the reference date value based on the comparison the predetermined action comprises responding to the request with a message indicating that access to the second data has expired.

6. The computer-implemented method according to claim 1, the computer-implemented method further comprising:
encrypting the second data;

receiving an indication of a time at which the second data is decrypted and a user who has accessed the decrypted second data; and storing a record comprising at least the indication of the time at which the second data was decrypted and the user who accessed the decrypted second data.

7. The computer implemented method according to claim 1, wherein the method comprises obtaining the reference date value from a remote data processing system, and wherein the reference date value is an objective reference date value.

8. The computer implemented method according to claim 1, wherein the reference date value represents a current date and/or time.

9. The computer-implemented method according to claim 1, wherein the second data comprises metadata indicating that the second data is available for a single use to recover at least some of the selected portions of the image data.

10. The computer-implemented method according to claim 1, wherein the second data represents, for at least one of the selected portions of the image data, a difference between the selected portion of the image and a respective modified portion of the image data.

11. The computer-implemented method according to claim 1, wherein the second data comprises the selected portions of the image data.

12. A data processing system for processing a video stream comprising:

at least one processor; and storage comprising computer-executable instructions which, when executed by the at least one processor, cause the at least one processor to:

receive a video stream comprising a plurality of frames of image data;

selecting portions of the image data on the basis of first data indicating locations within the image data;

modify the selected portions to generate modified portions of the image data;

generate second data for use in recovering at least some of the selected portions from the modified portions, the second data comprising metadata representing an expiry date value for the second data, the expiry date value indicating a date and/or time at which access to the second data is to expire;

output the second data, unselected portions of the image data and the modified portions of the image data;

provide the modified portions of the image data and the unselected portions of the image data to a user at a first time by transmitting the modified portions of the image data and the unselected portions of the image data to a data processing system operated by the user; and at a second time, the second time being after the first time:

receive a request to provide the second data to the user;

compare the expiry date value for the second data with a reference date value; and perform a predetermined action in dependence on the comparison of the expiry date value with the reference date value, wherein if it is determined that the expiry date value represents a later date and/or time than the reference date value based on the comparison, the predetermined action comprises providing the second data to the user by transmitting the second data to the data processing system operated by the user.

13. The data processing system according to claim 12, further comprising an object detection module for detecting a predetermined class of objects represented by the image data to generate the first data.

14. A non-transitory computer-readable storage medium comprising computer-executable instructions which, when executed by at least one processor, cause the at least one processor to:

receive a video stream comprising a plurality of frames of image data;

selecting portions of the image data on the basis of first data indicating locations within the image data;

modify the selected portions to generate modified portions of the image data;

generate second data for use in recovering at least some of the selected portions from the modified portions, the second data comprising metadata representing an expiry date value for the second data, the expiry date value indicating a date and/or time at which access to the second data is to expire; and output the second data, unselected portions of the image data and the modified portions of the image data;

provide the modified portions of the image data and the unselected portions of the image data to a user at a first time by transmitting the modified portions of the image data and the unselected portions of the image data to a data processing system operated by the user; and at a second time, the second time being after the first time:

receive a request to provide the second data to the user;

compare the expiry date value for the second data with a reference date value; and perform a predetermined action in dependence on the comparison of the expiry date value with the reference date value, wherein if it is determined that the expiry date value represents a later date and/or time than the reference date value based on the comparison, the predetermined action comprises providing the second data to the user by transmitting the second data to the data processing system operated by the user.

15. A computer-implemented method for data processing, the computer-implemented method comprising:

receiving second data and modified portions of image data generated using a computer-implemented method according to claim 1, wherein the second data comprises metadata representing an expiry date value for the second data;

obtaining a reference date value;

comparing the reference date value to the expiry date value; and conditional on the reference date value representing an earlier date and/or time than the expiry date value, processing at least some of the modified portions using the second data to recover selected portions of the image data.

16. The computer-implemented method according to claim 15, wherein obtaining a reference date value comprises requesting a reference date value from a remote computing device.

17. A data processing system for processing image data comprising:

at least one processor; and storage comprising computer-executable instructions which, when executed by the at least one processor, cause the at least one processor to:

receive second data and modified portions of image data generated using a computer-implemented method according to claim 1, wherein the second data comprises metadata representing an expiry date value for the second data;

obtain a reference date value;

compare the reference date value to the expiry date value; and conditional on the reference date value representing an earlier date and/or time than the expiry date value, process at least some of the modified portions using the second data to recover selected portions of the image data.

18. A non-transitory computer-readable storage medium comprising computer-executable instructions which, when executed by at least one processor, cause the at least one processor to:

receive second data and modified portions of image data generated using a computer-implemented method according to claim 1, wherein the second data comprises metadata representing an expiry date value for the second data;

obtain a reference date value;

compare the reference date value to the expiry date value; and conditional on the reference date value representing an earlier date and/or time than the expiry date value, process at least some of the modified portions using the second data to recover selected portions of the image data.

* * * * *